(12) United States Patent
Jitkoff et al.

(10) Patent No.: US 10,515,144 B2
(45) Date of Patent: Dec. 24, 2019

(54) ON-DEMAND AUTO-FILL

(71) Applicant: Google LLC, Mountain View, CA (US)

(72) Inventors: John Nicholas Jitkoff, Palo Alto, CA (US); Roma R. Shah, San Francisco, CA (US)

(73) Assignee: Google LLC, Mountain View, CA (US)

( * ) Notice: Subject to any disclaimer, the term of this patent is extended or adjusted under 35 U.S.C. 154(b) by 496 days.

(21) Appl. No.: 15/335,898

(22) Filed: Oct. 27, 2016

(65) Prior Publication Data
US 2017/0046325 A1 Feb. 16, 2017

Related U.S. Application Data

(63) Continuation of application No. 13/300,290, filed on Nov. 18, 2011, now abandoned.
(Continued)

(51) Int. Cl.
| G06F 17/30 | (2006.01) |
| G06F 3/048 | (2013.01) |
| G06F 17/24 | (2006.01) |
| G06Q 30/06 | (2012.01) |
| G06F 3/0481 | (2013.01) |
| G06F 3/0482 | (2013.01) |

(Continued)

(52) U.S. Cl.
CPC .......... *G06F 17/243* (2013.01); *G06F 3/0482* (2013.01); *G06F 3/0486* (2013.01); *G06F 3/04817* (2013.01); *G06F 16/9577* (2019.01); *G06Q 30/0633* (2013.01); *G06Q 30/0641* (2013.01); *G06Q 50/01* (2013.01)

(58) Field of Classification Search
CPC .............................. G06F 17/243; G06F 3/0481
See application file for complete search history.

(56) References Cited

U.S. PATENT DOCUMENTS 5,495,565 A * 2/1996 Millard ................. G06F 17/243
715/209
6,192,380 B1 * 2/2001 Light .................... G06F 17/243
707/999.009
(Continued)

FOREIGN PATENT DOCUMENTS

| EP | 1647906 | 4/2006 | |
| WO | WO 02/03239 | 1/2002 | |
| WO | WO-0203239 A1 * | 1/2002 | ........... G06F 3/0481 |

OTHER PUBLICATIONS

Araujo et al. SpringerLink [online]. "Carbon: Domain-Independent Automatic Web Form Filling," in *Lecture Notes in Computer Science*, vol. 6189, pp. 292-306, 2010, [retrieved on Nov. 28, 2011]. Retrieved from the Internet: <URL: https://springerlink3.metapress.com/content/dh0104383081177/resource-secured/?target=fulltext.pdf&sid=ehf45whhattj5jy15xmfjq&3q&sh=www.springerlink.com>. 1 page.

(Continued)

*Primary Examiner* — Scott T Baderman
*Assistant Examiner* — Mario M Velez-Lopez
(74) *Attorney, Agent, or Firm* — Botos Churchill IP Law

(57) ABSTRACT

A method for user interaction with a web page includes displaying a web page in a web browser, displaying a user-selectable object outside the web browser on a user interface, receiving a user selection of the user-selectable object and a dragging of the user-selectable object onto the web browser, and causing a command to be performed with the web browser in response to the user selection.

20 Claims, 25 Drawing Sheets

Related U.S. Application Data

(60) Provisional application No. 61/415,339, filed on Nov. 18, 2010.

(51) Int. Cl.
  *G06F 3/0486*  (2013.01)
  *G06Q 50/00*  (2012.01)
  *G06F 16/957*  (2019.01)

(56) References Cited

U.S. PATENT DOCUMENTS

| | | | | |
|---|---|---|---|---|
| 6,490,601 | B1* | 12/2002 | Markus | G06F 17/243 |
| | | | | 705/80 |
| 6,651,217 | B1* | 11/2003 | Kennedy | G06F 17/243 |
| | | | | 715/224 |
| 6,910,179 | B1* | 6/2005 | Pennell | G06F 17/243 |
| | | | | 715/207 |
| 6,925,308 | B2* | 8/2005 | Goldsmith | H04B 7/18571 |
| | | | | 455/412.1 |
| 6,928,623 | B1* | 8/2005 | Sibert | G06F 3/0481 |
| | | | | 715/783 |
| 7,197,475 | B1 | 3/2007 | Lorenzen et al. | |
| 7,254,569 | B2* | 8/2007 | Goodman | G06F 17/243 |
| 7,660,779 | B2 | 2/2010 | Goodman et al. | |
| 7,680,694 | B2 | 3/2010 | Glazer et al. | |
| 7,877,295 | B2 | 1/2011 | Mengerink et al. | |
| 8,255,323 | B1* | 8/2012 | Casey | G06Q 20/3221 |
| | | | | 705/35 |
| 2002/0052806 | A1 | 5/2002 | Hodson et al. | |
| 2002/0087430 | A1 | 7/2002 | Davis et al. | |
| 2006/0059434 | A1 | 3/2006 | Boss et al. | |
| 2006/0179404 | A1* | 8/2006 | Yolleck | G06F 17/243 |
| | | | | 715/272 |
| 2006/0218088 | A1* | 9/2006 | Flora | G06Q 10/10 |
| | | | | 705/39 |
| 2007/0064004 | A1 | 3/2007 | Bonner et al. | |
| 2007/0118434 | A1 | 5/2007 | Mengerink et al. | |
| 2007/0198432 | A1 | 8/2007 | Pitroda et al. | |
| 2009/0125809 | A1* | 5/2009 | Trapani | G06F 17/211 |
| | | | | 715/273 |
| 2009/0132405 | A1* | 5/2009 | Scipioni | G06Q 20/12 |
| | | | | 705/35 |
| 2010/0042535 | A1 | 2/2010 | Stone | |
| 2011/0197119 | A1* | 8/2011 | Ye | G06Q 30/08 |
| | | | | 715/226 |
| 2011/0307389 | A1 | 12/2011 | Francia et al. | |
| 2012/0079581 | A1* | 3/2012 | Patterson | G06Q 20/206 |
| | | | | 726/7 |
| 2014/0149263 | A1* | 5/2014 | Denton | G06F 17/243 |
| | | | | 705/27.1 |

OTHER PUBLICATIONS

International Preliminary Report on Patentability for Application No. PCT/US2011/061496, dated May 30, 2013, 12 pages.
Bederson B. B. et al. "A Zooming Web Browser." Proceedings of SPIE, SPIE, US, vol. 2667, Jan. 1, 1996.
Bjork et al. "WEST: A Web Browser for Small Terminals." UIST. Proceeding of the Annual ACM Symposium on User Interfacesoftware and TechnolO!!V, vol. 1, No. 1, Jan. 1, 1999.
International Search Report & Written Opinion for Application No. PCT/US2011/061497, dated May 21, 2012, 19 pages.
International Search Report & Written Opinion for Application No. PCT/US2011/061496, dated May 21, 2012, 17 pages.

* cited by examiner

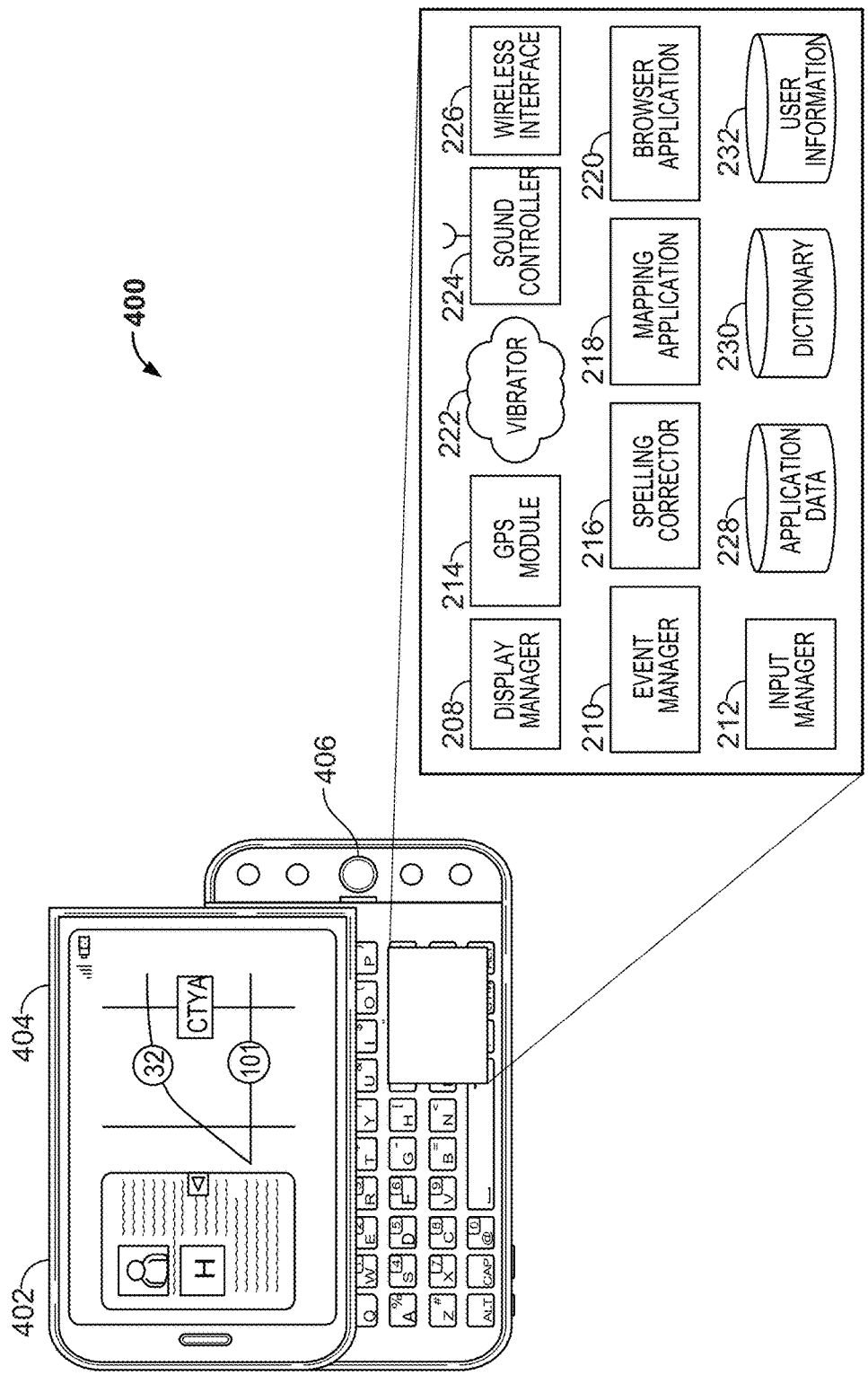

ON-DEMAND AUTO-FILL

CROSS-REFERENCE TO RELATED APPLICATION

The present application is a continuation of and claims priority to U.S. application Ser. No. 13/300,290, titled "On-Demand Auto-Fill", filed on Nov. 18, 2011, which claims priority to U.S. Provisional Application Ser. No. 61/415,339, titled "User Interaction in a Web Browsing System", filed on Nov. 18, 2010, the contents of each are incorporated by reference as if set forth fully herein.

TECHNICAL FIELD

This document relates to systems and techniques for interacting with users of a web browser or similar application that accepts data input.

BACKGROUND

Much of the interaction that users now have with computing devices now occurs on-line—in the so-called cloud. Such interaction has moved from simply being able to read text-based web pages, to basic shopping and other services, to rich services that are hosted wholly separate from the client computing device that a user may employ. Various programming techniques have permitted sophisticated actions to occur at the client device, including actions when the client device is off-line, and those actions to be coordinated with a server system that hosts various services for users of the system.

Very rich services are thus now possible via a web browser. Modern browsers, such as the CHROME browser from GOOGLE INC., of Mountain View, Calif., can run computer code and perform essentially any function that can be performed by other native applications. As a result, computer users are spending more times with their browsers, and the ability to interact well with a browser has become more important. User of mobile device also frequently download web applications and interact with the to perform actions similar to those performed with web pages of plug-ins in browsers, such as on-line shopping, game, playing, social networking, and the like.

SUMMARY

This document describes systems and techniques that may be used to interact with a user of a browser or similar application on a computing device, such as a mobile computing device (e.g., a smart phone). The various techniques described here can provide mechanisms for more intuitive user interaction with a browser or other application, including by making more convenient the switching between pages that are currently loaded in a browser (e.g., between tabs in a tabbed browser), by automatically generating favicon's for web page names, by making web page names in a list such as a favorites or history list interactive, by permitting convenient yet secure addition of information to fillable web forms, by providing for the display of web page content in different formats, and by providing convenient mechanisms for selecting objects and actions in a cascading menu structure.

In implementations described in particular detail in this document, techniques are discussed that allow a user of an application to automatically fill information into a form, such as a form on a web page. By the techniques discussed here, a selectable control such as an icon may be displayed, and that selectable control may be correlated to certain information about a user or the user's device or account. For example, a user may have an icon that is associated with each of the various credit cards that the user has, and each icon can be correlated to information about the credit card, such as the credit card number, expiration date, user name, 3-digit code, billing address and the like. Another icon may represent information about the user himself, such as his name, address, and the like. Each icon may be labeled in a manner that makes clear the information that it is a "front" for.

The icons may be normally displayed on a desktop of a device operating system, such as in a traditional grid of icons that float over a background or wallpaper. Simultaneously, and over a different part of the desktop, a user may display a web page or content in a native application that requires data input from the user. In some instances, the user may type a few letters and the information may be added automatically, after having been stored a prior time the user typed in similar information on another form. However, such a technique may result in the user inadvertently supplying information to the page or the application. As described below, however, a user could supply the same information by selecting one of the icons discussed above and dragging it into the area of the form that is to receive the input, or onto an icon adjacent to, or that otherwise represents the form. Such an action by the user may be interpreted as an intent to have all relevant information that is fronted by the icon to be added to the form. For example, if the form is for a mailing address on an order form, the user's dragging of his personal icon onto the firm may cause it to be filled out completely, whereas his dragging of a credit card icon onto such a form might add his name to the form, but nothing else.

In some embodiments, a method for user interaction with a web page is provided. The method includes displaying a web page in a web browser, displaying a user-selectable object outside the web browser on a user interface, receiving a user selection of the user-selectable object and a dragging of the user-selectable object onto the web browser, and causing a command to be performed with the web browser in response to the user selection and dragging.

In other embodiments, the user-selectable object comprises payment card information for a user of the web browser, selection of the user-selectable object comprises dragging the user-selectable object to a payment icon on a web page associated with a merchant, and the command causes a payment to be made to an account that corresponds to the merchant, the payment coming from an account that corresponds to the payment card.

The disclosed methods can provide one or more advantages in certain implementations. For example, rather than automatically filling web forms, the method can be implemented to require affirmative authorization by the user before the web forms are filled with previously-stored information—i.e., the act of going to get the icon or other selectable object, and then bring in it back to the form is an intentional enough act to prevent accidental divulgence of information. In scenarios in which the previously-stored information may be sensitive in nature (e.g., credit card information, social security number, date of birth, etc.), requiring user authorization before the stored data is accessed or used provides an added layer of security. Using other known methods, a user may try to secure such information by keeping sensitive information in trusted places (e.g., only taking out a credit card out of a purse or wallet when a purchase is about to be made). However, constantly having to retrieve the sensitive information from its trusted place can be time-consuming and inconvenient. For example, if a person is sitting on her bed while using her laptop to make a purchase, it would be inconvenient for that person to have to go and retrieve her purse from another room every time she wished to buy an item online. The disclosed methods do not require a user to constantly have to retrieve the sensitive information physically, decreasing the likelihood that the information may be lost or compromised in transit prior to or after being entered into a web form (e.g., constantly having to retrieve a credit card resulting in misplacing the credit card).

It is further inconvenient for the shopper to have to fill out forms (e.g., credit card information) requiring multiple pieces of information that may be prone to typographical errors by the user (e.g., long credit card numbers). The disclosed methods allow the user to simply click and drag an icon associated with her credit card in order to obtain her credit card information and use her credit card to make a purchase. Alternatively, using prior known methods, the shopping page the user is browsing may store her credit card information. The disclosed method advantageously does not store the sensitive information with a third party (e.g., a third party merchant), protecting the information from potential security breaches relating to the third party, and further requires the user to affirmatively indicate and intent to submit her information.

The details of one or more embodiments are set forth in the accompanying drawings and the description below. Other features and advantages will be apparent from the description and drawings, and from the claims.

DESCRIPTION OF DRAWINGS

FIGS. 1E-1I show screen shots of example supplementary controls that can be provided with a web browser in an operating system.

FIG. 1J shows a screen shot of an operating system displaying thumbnails of recently visited web pages that a user can select.

FIG. 4 is a schematic diagram of a mobile computing device for interacting with a user of a web browser system.

Like reference symbols in the various drawings indicate like elements.

DETAILED DESCRIPTION

This document describes systems and techniques for providing interaction with a user of a computing device, such as a mobile smart phone, using, for example, elements of an operating system that runs on the device. The system and techniques may provide various output mechanisms that can be implemented visually, audibly, or via touch, and input mechanisms for controlling the device. Multiple particular example techniques are described here, and the techniques can be implemented individually or together with other aspects of an operating system.

Various techniques are described here, and the particular techniques may be used in combination with each other. One particular technique described in greater detail in multiple implementations below involves dragging an icon or other visible object that represents a set of data from a source location on a user interface to a target location, where the target location represents a receiver of such information, such as a web form that can be filled out of the user. The user action of dragging the icon or other object to the receiver may be interpreted by a system as showing a user intent that the information represented by the object can be provided to the form and the form be automatically filled out. While the object (e.g., icon) may be physically located outside a browser or other application on a visual display, the particular information for the object may be stored within or without the browser. For example, the information may be stored in the same way that other form-filling information is traditionally stored for a browser, and the browser may be programmed to keep the information secure except in conditions where the user performs the inputs described here (though a user can turn such a feature on or off, in a configuration page). In such a situation, the user will need to trust the browser, which is relatively easy to so since the major web browsers are produced by reputable companies. Alternatively, the information may be stored with the particular object, and outside a browser or other application to which the information is to be provided. A browser designer may publisher an API by which information is to be shared with pages in the browser, from such objects. Objects that comply with the API can be displayed on a desktop of an operating system, and the operating system may mediate data transfer between them according to the rules of the API.

Figure 1A:
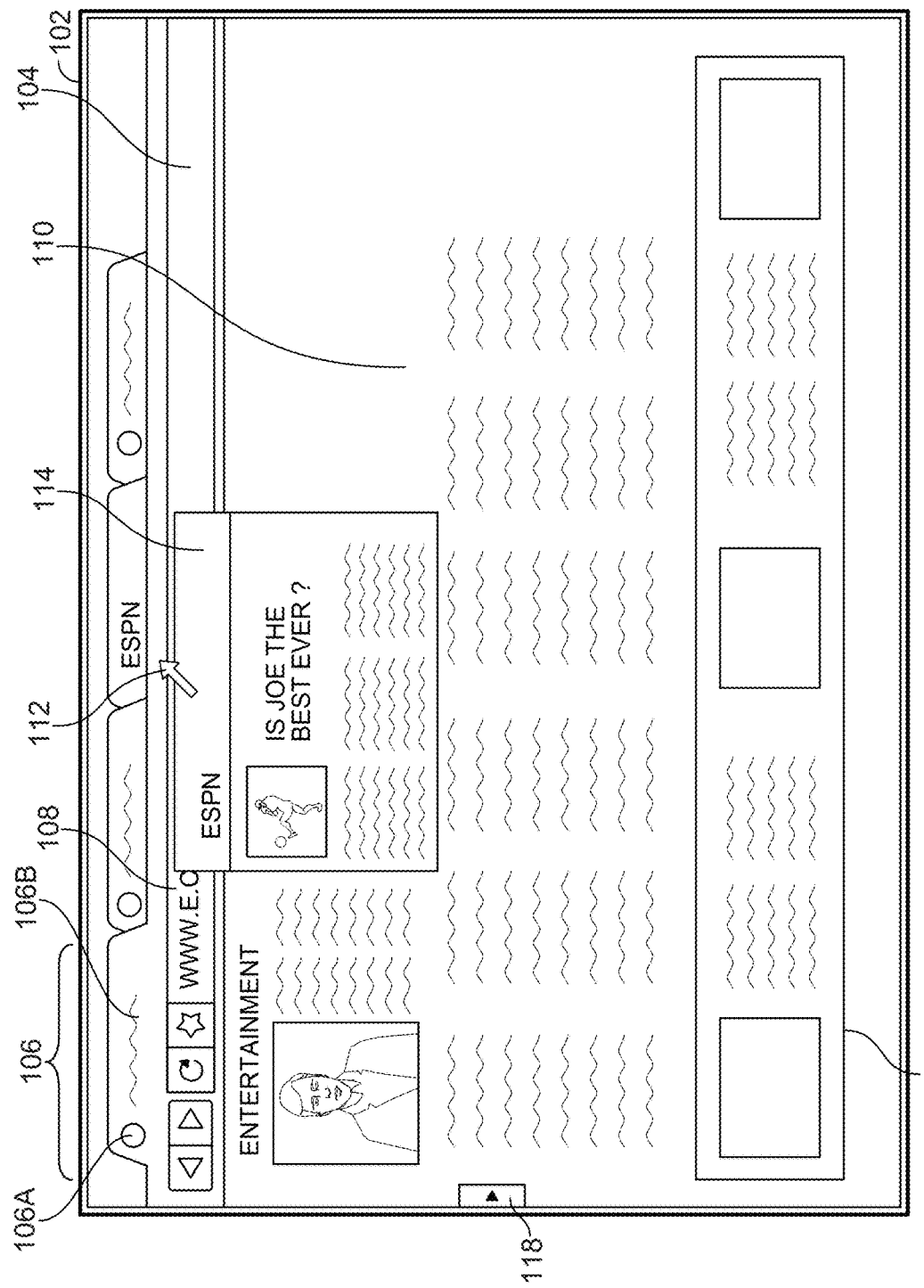
FIGS. 1A and 1B are diagrams showing web page previews in a tabbed browser system.
Figure 1B:
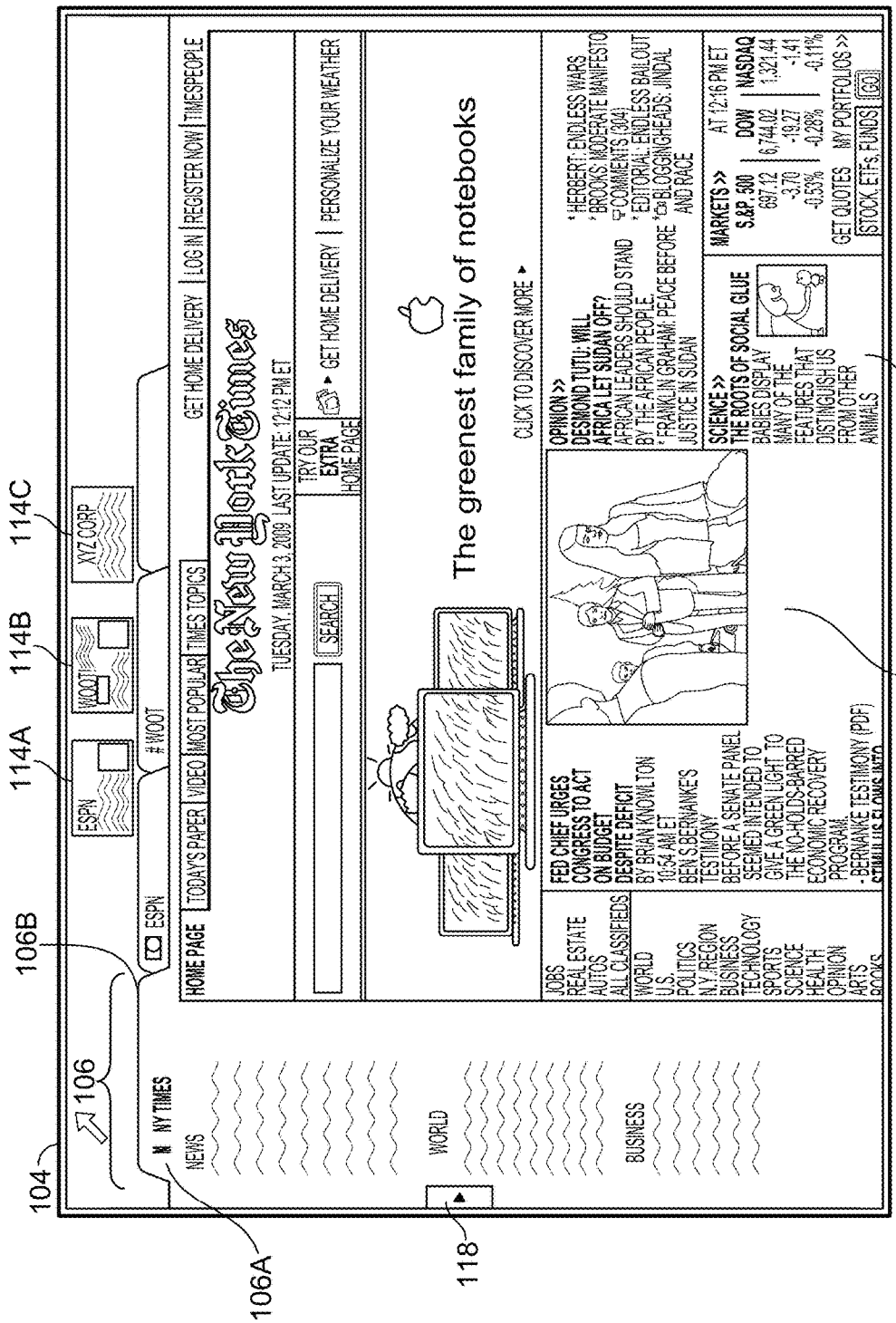

FIGS. 1A and 1B are diagrams showing web page previews in a tabbed browser system. In general, the displays show how a user of a web browser can be shown what obscured pages look like so that they can determine whether to switch the browser's focus to those pages.

A first display 102 shows a mechanism for previewing obscured pages one page at a time. In this example, a tabbed web browser is shown displaying a number of pages such as page 110, which includes a URL and search entry area 108, a tab 106, a favicon 106A on the tab, and a page title 106B on the tab, and an information bar 104. Tabs for other pages that have been loaded by the browser are also shown, but those pages are obscured—hidden behind the page 110 that is the focus of the browser. In this manner, the browser display is much like that of the current GOOGLE CHROME browser. The browser in this example can be integrated with the device operating itself, and can be the only application to run on the device, where any applications to be run by the user must run under the browser.

A selectable control 118 in the form of a tab near a periphery of the display, is shown over a small part of the page 110. User selection of the tab is described more fully with respect to FIG. 1C.

A pointer 112 is shown over a tab for one of the obscured pages, thus indicating that a user has placed their finger on a touch screen over the tab, or is hovering the pointer over the tab using an input device like a mouse. In response to such action by the user, a preview 114 of the web page that corresponds to the tab has been displayed on top of the page 110. The preview may be a thumbnail image of the current page, and may be displayed until the user stops hovering over the tab or selects the tab. If the user stops hovering, the preview 114 may simply disappear, and if the user selects the tab, the page 110 may become an obscured page, the tab where the user was hovering may jump forward, and the previously obscured page may become the focus page.

FIG. 1B shows a similar application of the concepts discussed here, but with a preview of multiple pages. In this example, the main page and the browser have slid downward in response to a user selection with a pointer in an area that was previously above a top edge of the browser such as on an operating system background at the very top of a display 104. As a result, three previews 114A, 114B, 114C have been displayed in the now-vacate space above the browser tabs, and in alignment with the tab for the obscured page that corresponds to the particular preview. Again, the previews are thumbnails formed in a familiar manner from a current view of each of the obscured pages. Also, the user may return the system to its original state and make the previews disappear by moving their pointer back into the body of the page 110, or they may switch the focus to one of the displayed pages by selecting one of the previews 114A, 114B, 114C.

The browser as shown in FIG. 1B is more chrome-free than is the browser shown in FIG. 1A. For example, the former browser does not include information bar 104. In a similar manner, various other forms of browsers may include preview mechanisms like those just discussed.

An alternative mechanism for displaying multiple previews is to display multiple previews in a manner like the preview 114 in FIG. 1A, an aligned beneath each relevant tab. In such a situation, the top of the browser would not have to be moved down, through the previews may obscure part of the page 110 that is the focus of the browser.

Figure 1C:
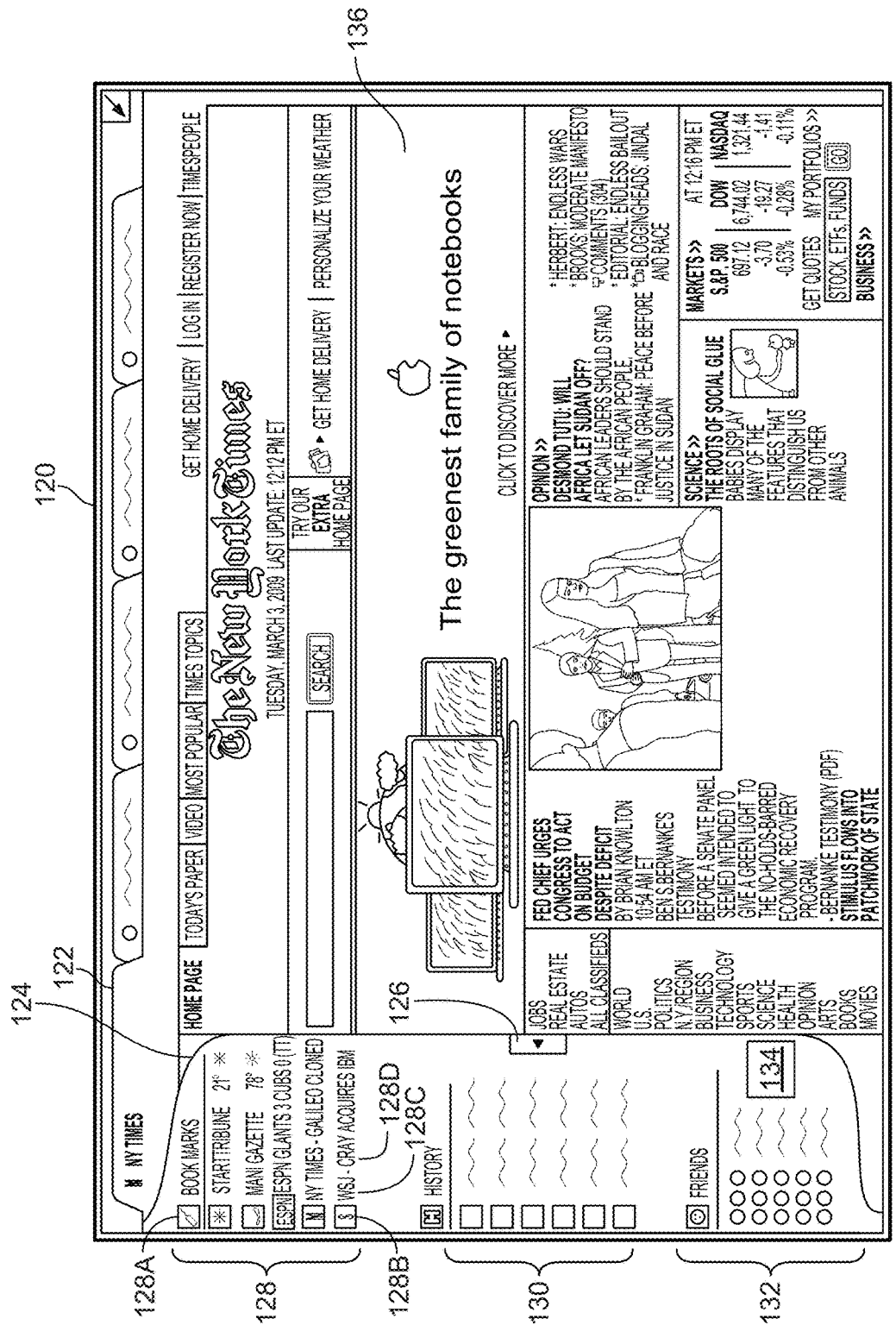
FIG. 1C shows a screen shot of a browser having a slidable information panel.

FIG. 1C shows a screen shot of a browser having a slidable information panel. Again, the browser is a tabbed browser where a number of different pages have been opened by the browser and one particular page 136 is the current focus of the browser.

The information panel 124 may be associated with a selection mechanism 126 that is like the selectable control 118 of FIGS. 1A and 1B, where a user selection of the mechanism 126 causes the panel 124 to be displayed. When the panel is displayed, it can slide in from off the side of the display 120 and push existing items on the display to the right. Alternatively, and as shown here, the panel 124 may slide over the top of the page 136 having tab 122, and then may slide back when the mechanism (whose arrow changes direction between the two states) is again selected.

The panel 124 may display a variety of categories of information, and a user may be allowed to select the appropriate categories and layout for their panel 124. In this example, the categories include bookmarks 128, web browsing history 130, and a chat application 132. The bookmarks are, as is known, titles and links to web pages that the user has previously identified as being important to them. The history is a list of names and links to pages that the user has visited. In certain implementations, the bookmarks and history may be combined into a single list. The chat application 132, takes a well-known form and shows icons of friends who are currently on-line, and provides a mechanism by which the user may type notes back-and-forth with those friends (e.g., in a text box 134).

The focus in this figure is on the particular display of the bookmarks section 128. That section is captioned with an icon and title 128A, and is provided with a listing for each bookmarked page. The history section 130 could be similarly displayed, though it is shown generically here for clarity.

Each entry in the listed bookmarks includes a favicon 128B, a title 128C, and dynamic content 128D. The favicon may be provided by a publisher of a web page that corresponds to each entry, or can be automatically generated by a process like that described in detail in relation to FIG. 5C. In particular, an image may be taken from the page to generate the favicon, or a topic for the page may be determined by analyzing the page, the topic (or topics) may be submitted to an image library, and one of the results from the library may be reformatted and assigned as the favicon.

The title 128C takes a familiar form. It is static content that provides a plain-english description of the web page, and may be obtained from a corresponding tag that an author of the page has provided.

The dynamic content 128D is appended to the title, and represent a variety of information associated with the page. For example, if a page is a sports-related page, the dynamic content may include scores from ongoing sporting events (as shown by the ESPN entry in FIG. 1C). If the page is a front page for a regional newspaper, the dynamic content may be the current weather in the city of the newspaper (as shown by the Star Tribune and Maui newspaper entries). And if the page is a national newspaper, the dynamic content may be a headline for a current news story (as shown by the New York Times and Wall Street Journal entries).

The content may be single content or multiple content. For the former, a single piece of content may be statically displayed, though updated when a change to the content occurs. For example, the temperature for Minneapolis may be updated in the Star Tribune entry if the temperature changes. For the latter, the content may continually change to present different sub-categories of information that falls under a common category. For example, in the ESPN entry, the scores of all ongoing baseball games may be displayed in the dynamic content 128D in succession. The display may be, for example, in the form of a slide show, where the displayed game clicks from one to the next every several seconds. The change may also be animated, such as in a horizontally moving ticker-tape fashion, or in a vertically scrolling fashion, where the system can pause when each score has been fully displayed on the line.

The information may be provided in various known manners, such as in a feed like an RSS feed. A relationship may be drawn between the underlying page and the relevant feed so that the two can be properly coordinate, in a variety of manners. For example, the page make include a tag that has a reference to the feed, and the browser can read that tag in order to start receiving information from the feed that can be placed into the dynamic content 128D.

In this manner, the system shown in the figure can provide a user with much more useful information in a listing of page names. Such a listing may then be displayed more frequently by a user, even if such display takes up space on the screen. The user may then benefit from having additional information and quicker access to pages that are listed in his or her bookmarks or history list.

Figure 1D:
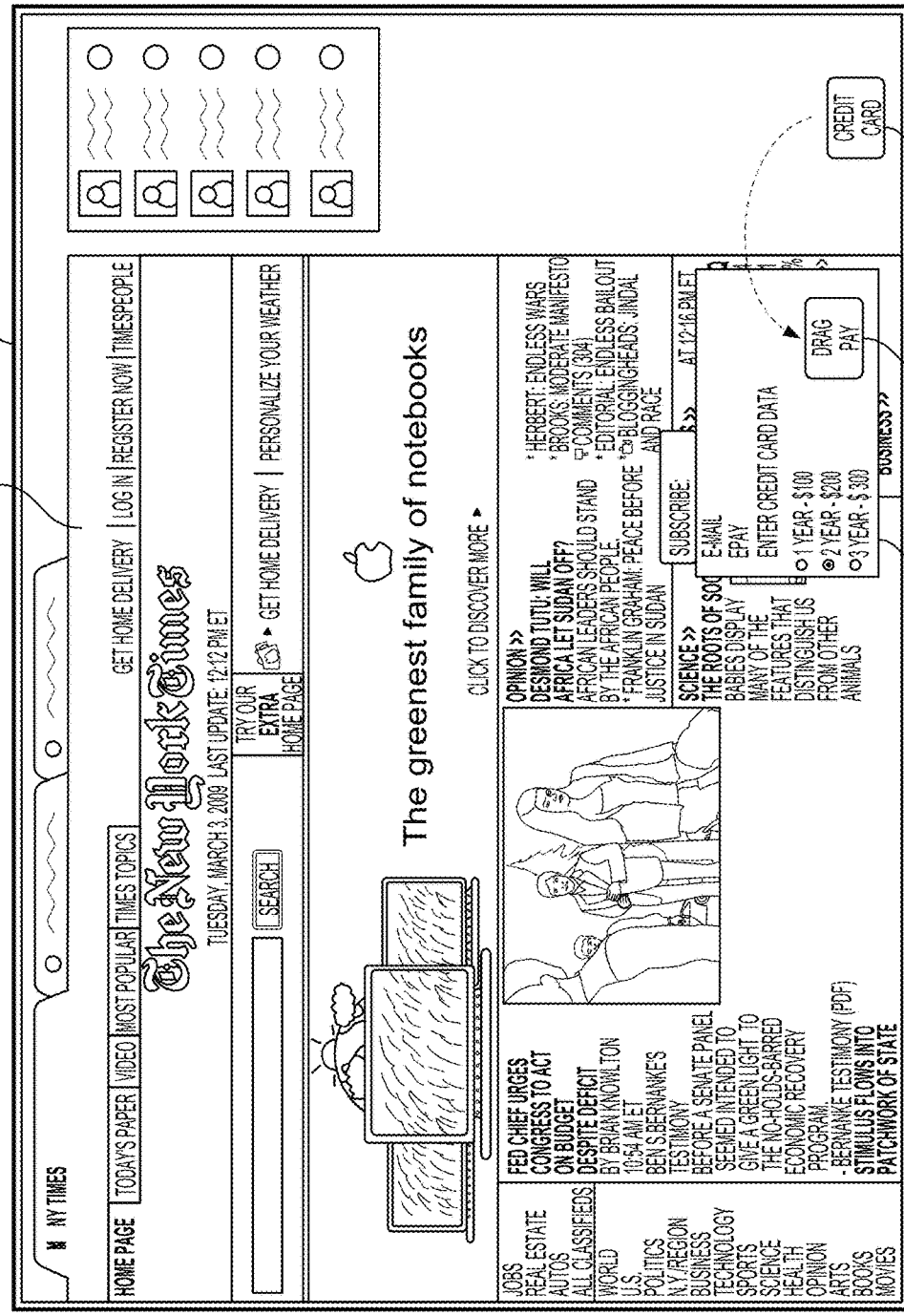
FIG. 1D shows an example of using a draggable icon to provide information to a web page form.

FIG. 1D shows an example of using a draggable icon 148 to provide information to a web page form. In this example, the icon provides a simple mechanism by which a user can enter the information without having to type it from scratch. Yet the mechanism is more secure than are auto-filling forms, as the user has to take affirmative action before the information that is represented by the icon 148 can be given to a provider of a web page—that is, the form is not "auto" filled. In this manner, the user may have a relatively simple, yet relatively secure, experience. Particular description of a process is provided below in relation to FIG. 5D.

Referring now more particularly to FIG. 1D, there is shown a display 140 which may be all or a portion of a graphical display on a computing device such as a laptop computer, a netbook, or a smart phone. Shown on the display, in a mostly chrome-free manner, is a browser 142 that displays a primary web page and shows tabs for a plurality of obscured web pages that have been opened in the browser but that are not currently the focus of the browser.

An advertisement 144 displayed on the browser 142 on the primary page includes an icon 146 that is a selectable control for submitting information to a fillable form. In this example, the advertisement is in the form of a gadget that is rendered in an iFrame element on the page. The advertisement is to receive access to an on-line newspaper subscription, and the user can enter his email address to establish an access credential. Mechanisms are also provided for the user to identify how long he wants the subscription for, and to select URLs that will take the user to screens for entering billing information manually (e.g., "epay" and "enter credit card data").

The advertisement 144, however, also provides a mechanism in the form of icon 146 and its underlying code, to provide credit card and other billing information almost fully automatically. The process is not fully automatic, however, as it requires a particular affirmative action by the user. The icon 146 is labeled with the name of such a technology ("drag pay" in this example) so as to alert the user of the availability of such a simplified and secure information submission technique. Thus, as shown by the dashed, curved arrow, the user has clicked on the icon 148, dragged it over to icon 146 and released, so as to indicate an intent by the user to have his "credit card" information applied to the application that underlies the icon 146. The user in this example previously filled out a form with his credit card information so that the application underlying icon 148 can pass on that information, and such storage and passing of information may be in a format that complies with a public API so that the application that underlies icon 146 may properly handle the information it receives. Receipt of the draggable icon 148 by the web browser indicates user authorization to access user information, which, in some instances, may be sensitive in nature.

In other embodiments, the user may drag and drop the icon 148 on other icons, images, text, or other elements for receiving information submissions on the web page. For example, in some embodiments, the user may drag and drop icon 148 directly onto a fillable web form, causing the form to be populated with previously-stored information. The form may contain a single entry to be filled by the user (e.g., "Full name") or multiple entries (e.g., "last name, first name, street address, city, state, zip code").

Figure 1E:
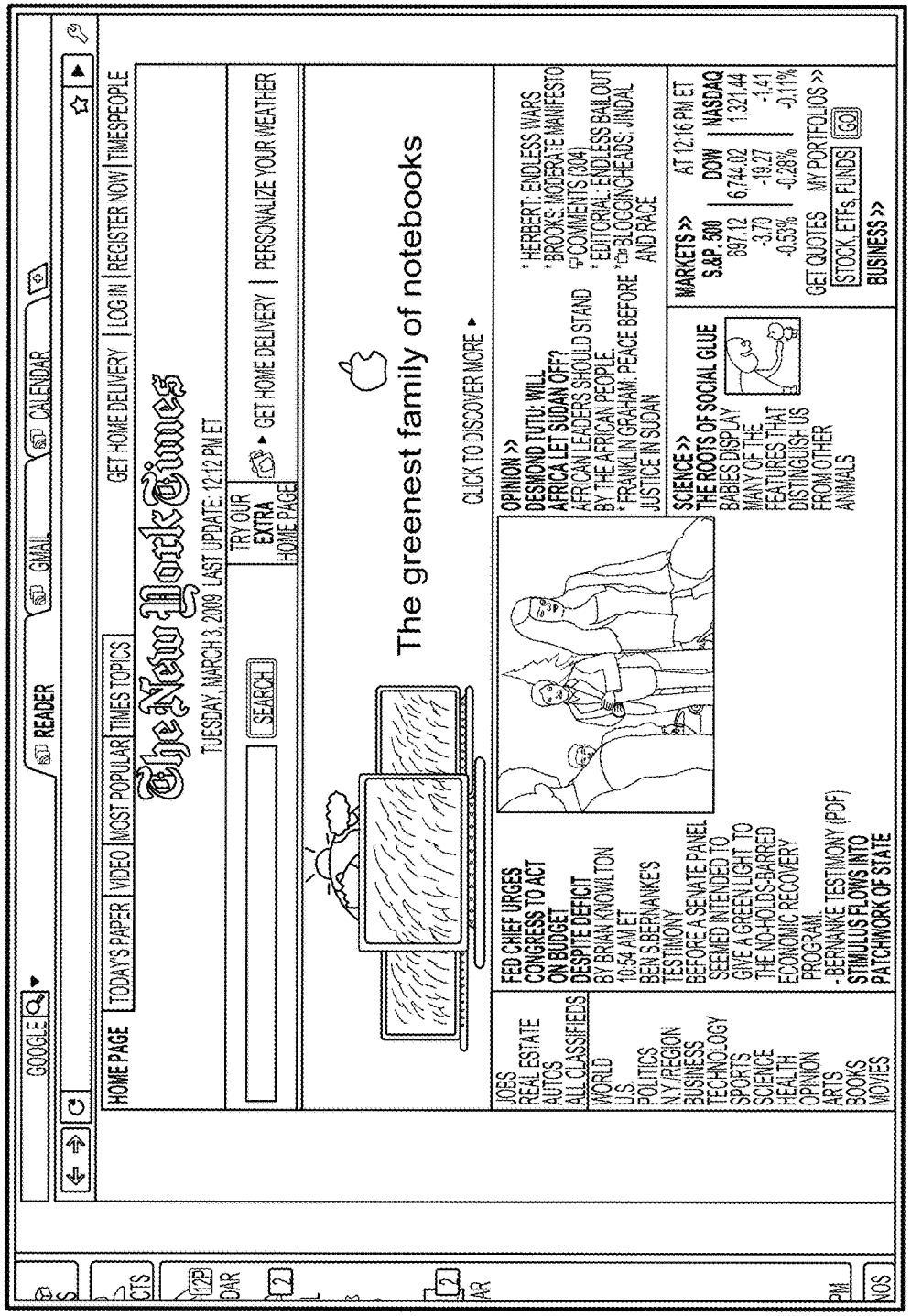
Figure 1F:
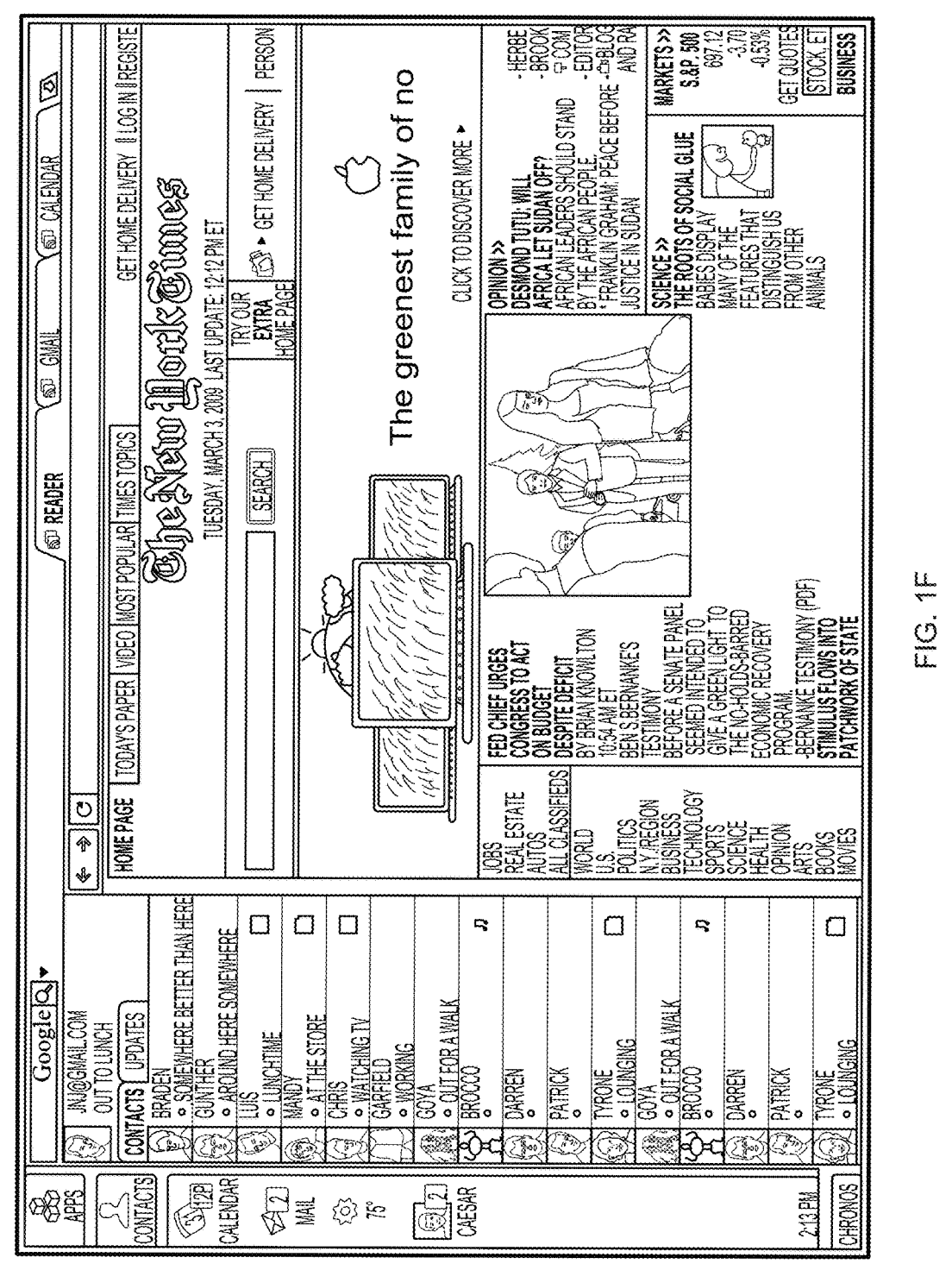
Figure 1G:
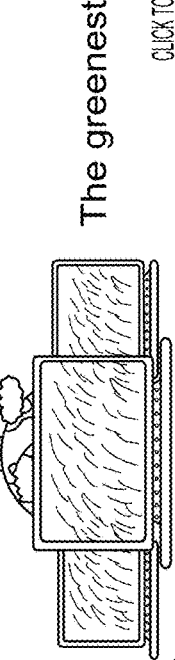
Figure 1H:
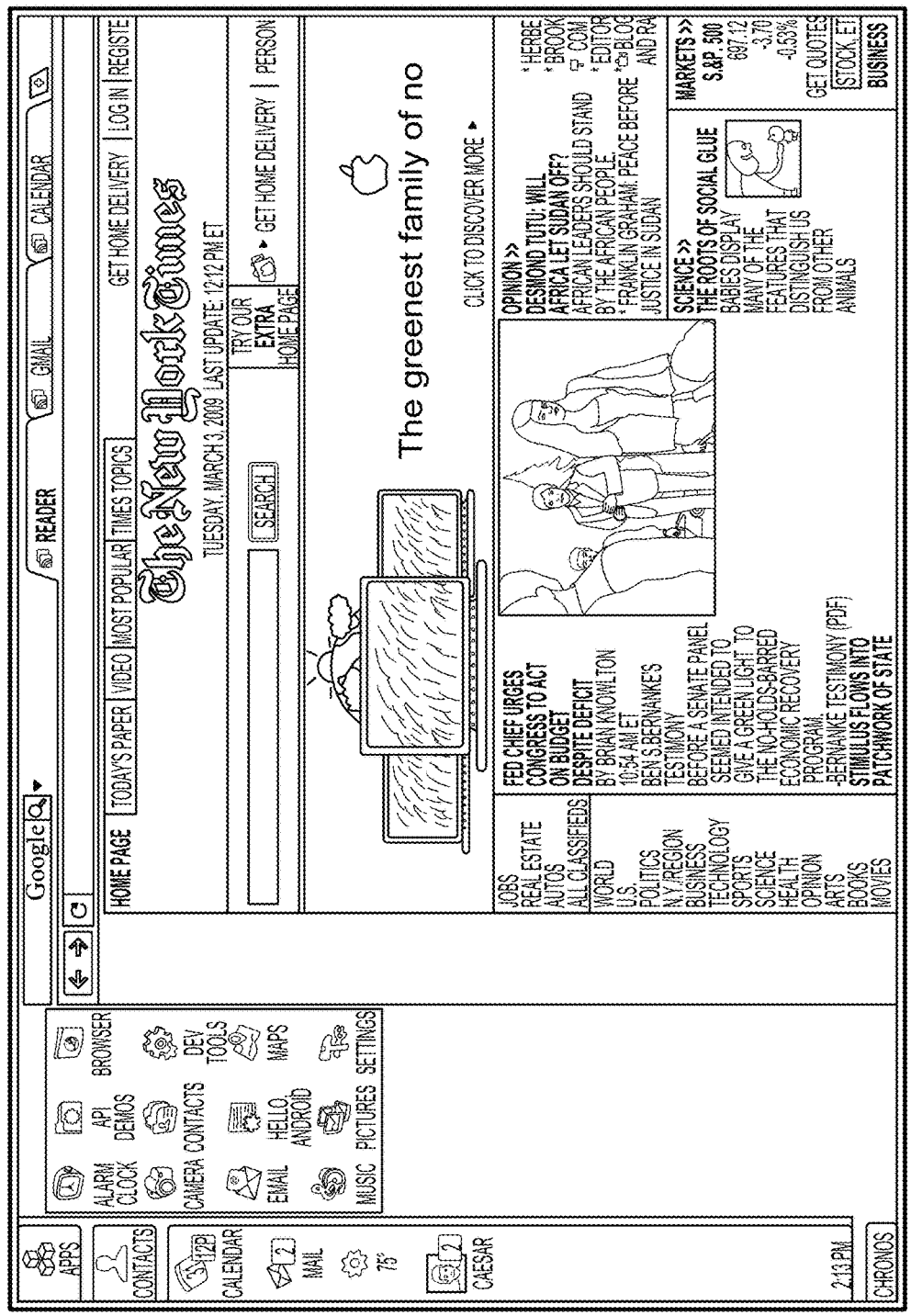
Figure 1:
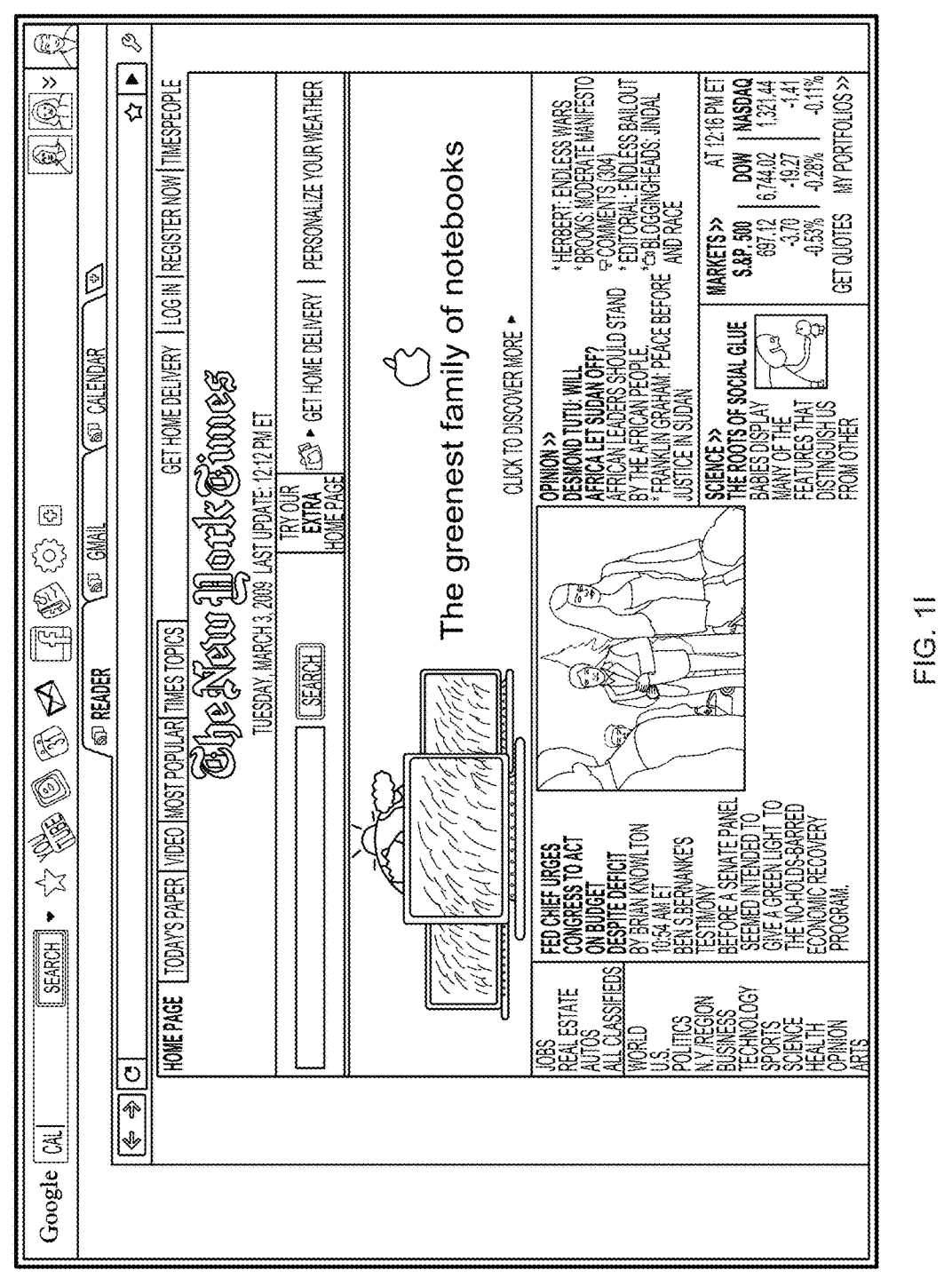
Figure 1J:
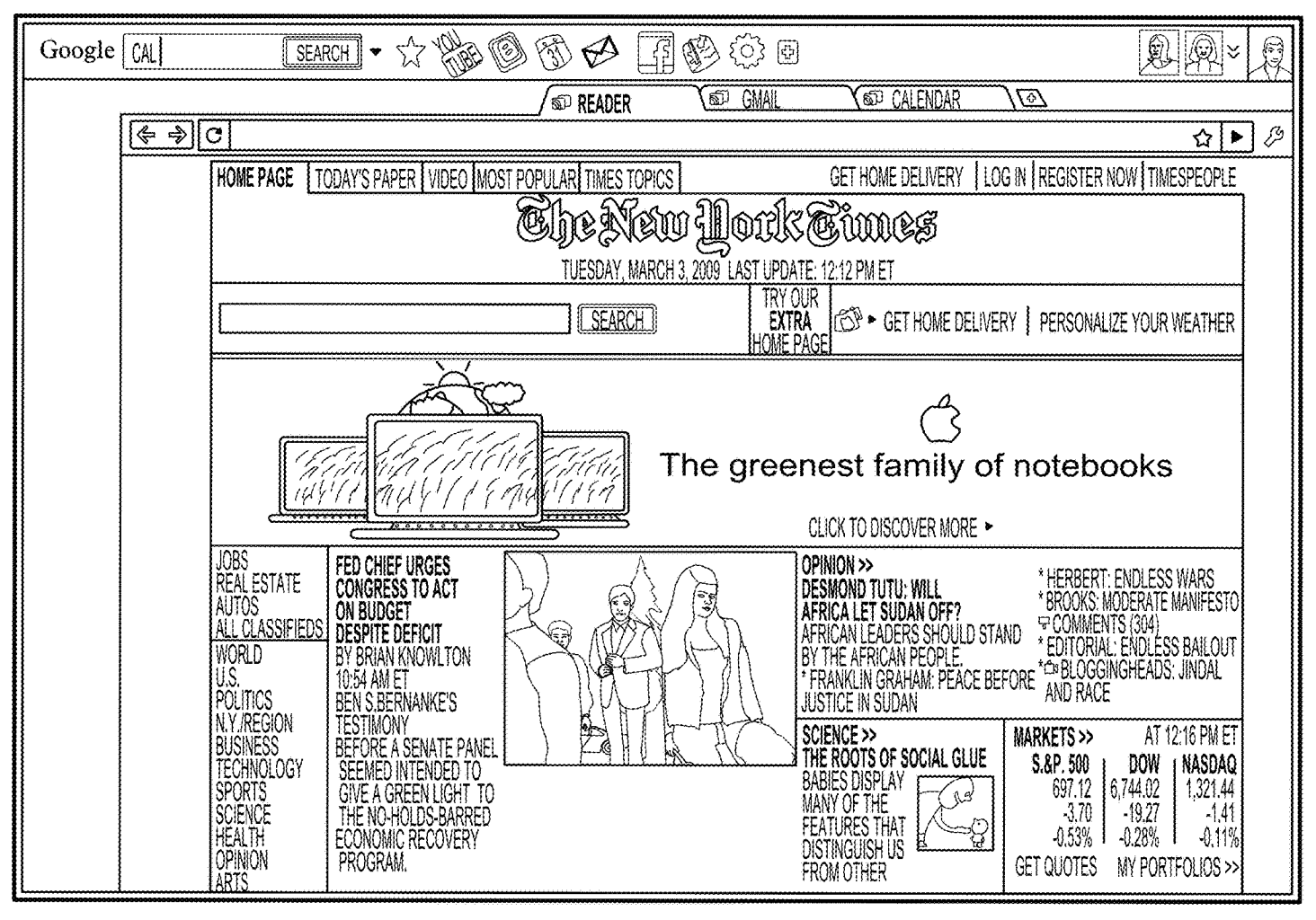
Figure 1K:
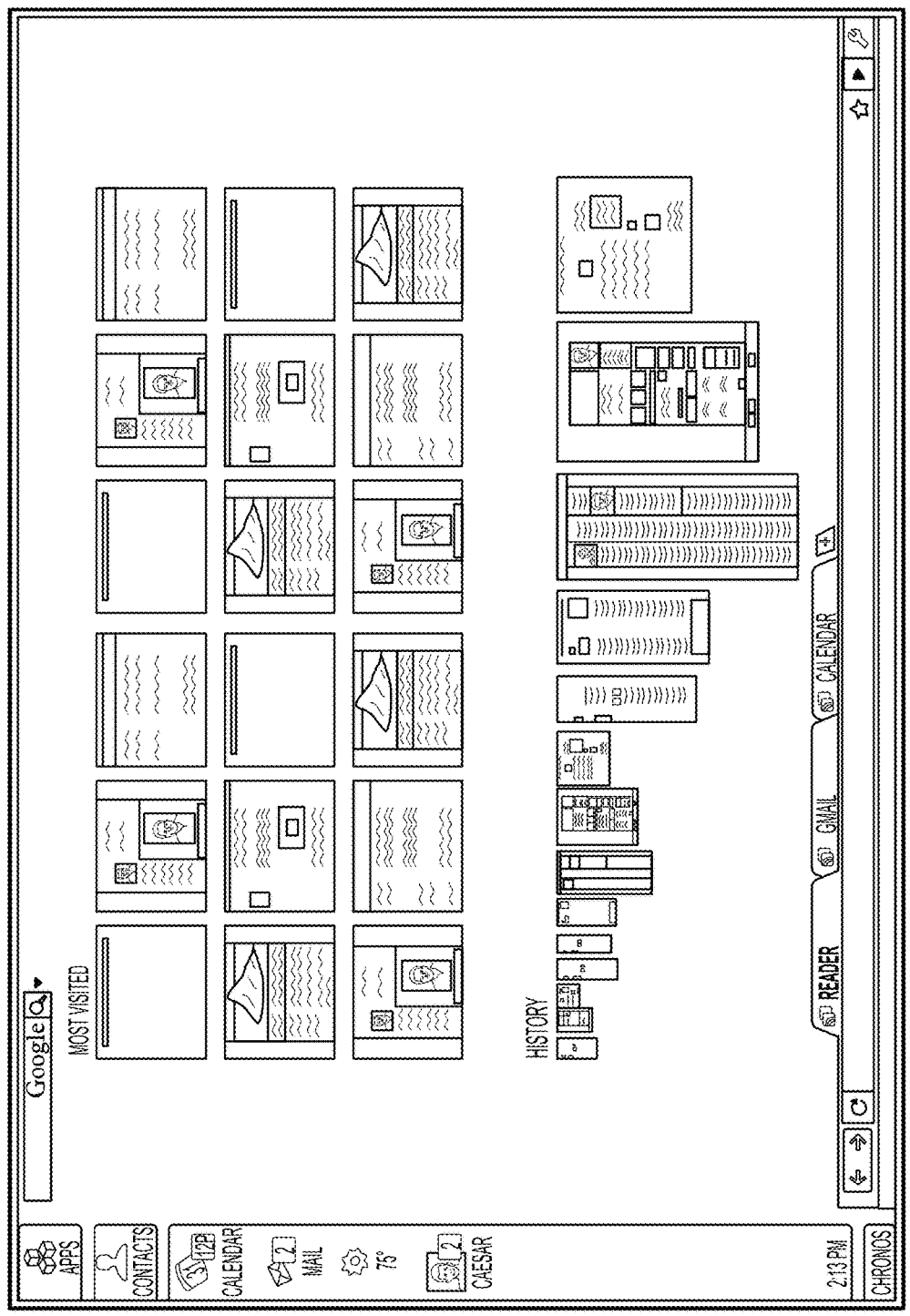
FIG. 1K shows a screen shot of an operating system displaying thumbnails of recently visited web pages that a user can select.
Figure 1L:
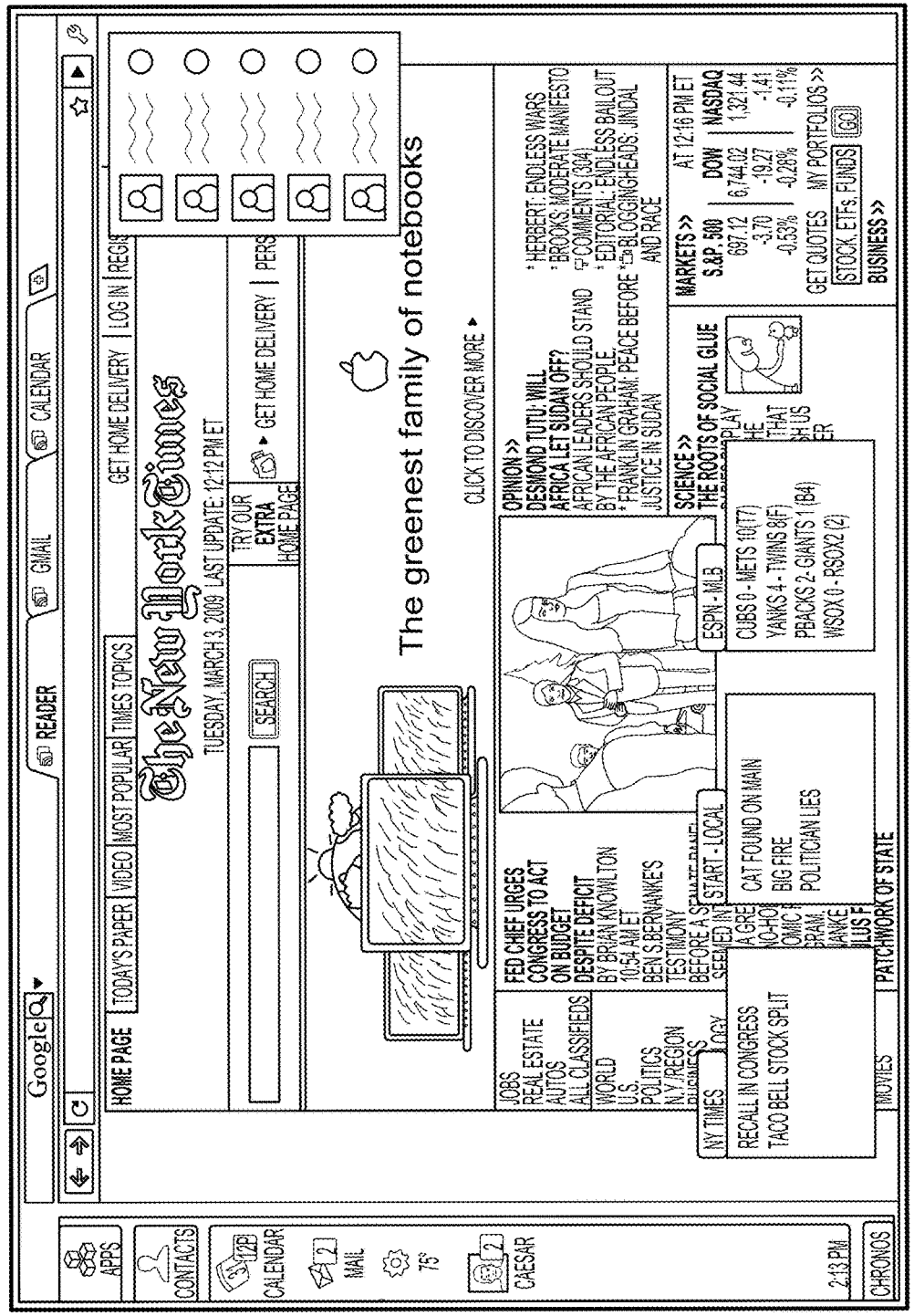
FIG. 1L shows example screen shots of web pages in maximized and minimized forms.
Figure 1M:
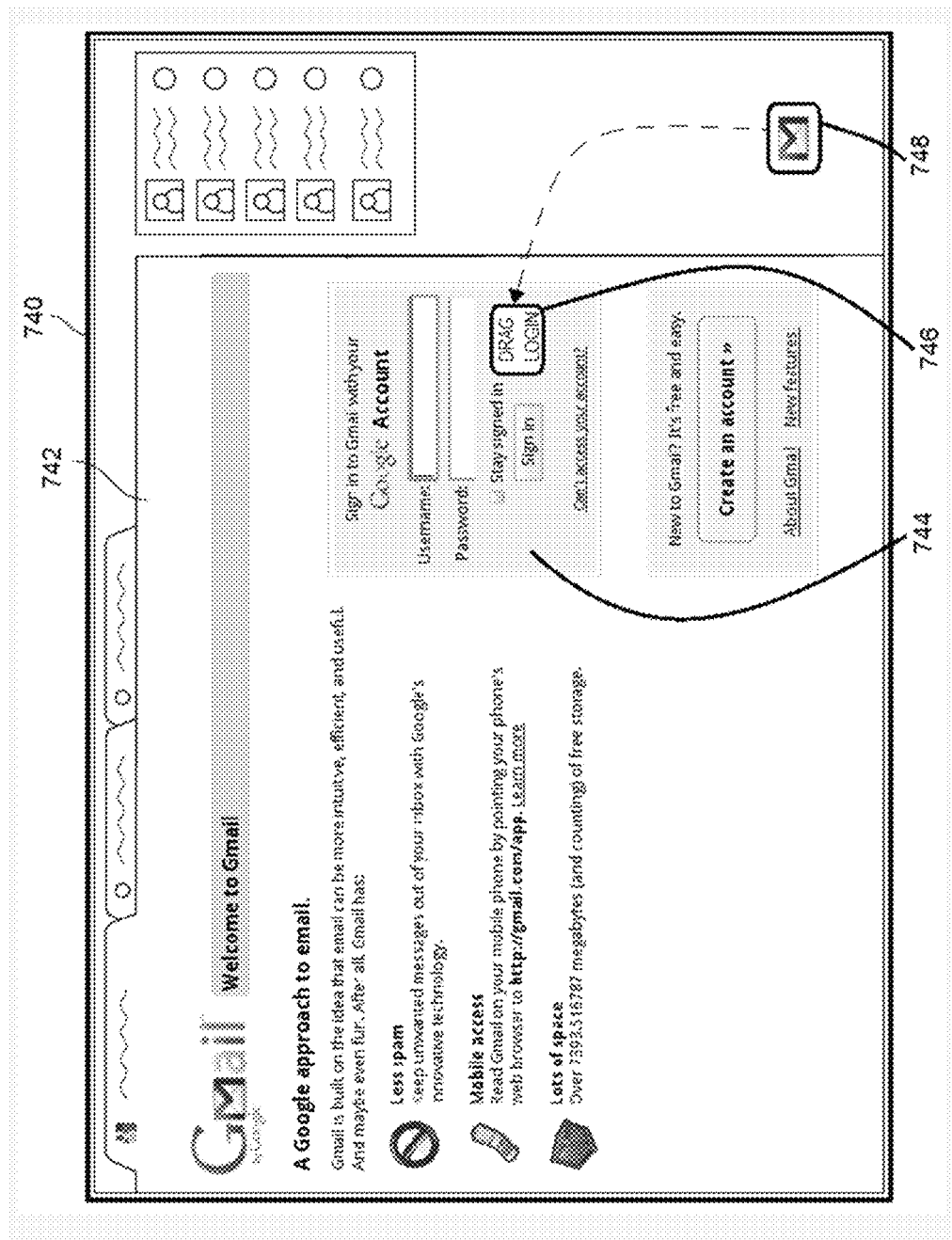
FIG. 1M shows an example of using a draggable icon to provide login information to a web page.

Referring to FIG. 1M, and continuing with features concerning the ability to drag content associated with a first item by dragging the first item to a second space, there is shown a display 740 which may be all or a portion of a graphical display on a computing device such as a laptop computer, a netbook, or a smart phone. Shown on the display is a browser 742 that displays a primary web page and shows tabs for a plurality of obscured web pages that have been opened in the browser but that are not currently the focus of the browser.

A login page for an e-mail account 744 displayed on the browser 742 on the primary page includes an icon 746 that is a selectable control for submitting information to a fillable form. Alternatively, a user may login using the entry boxes shown. In this example, the login page 744 is in the form of an e-mail login page. The login page requests a user to enter his user name and password to establish an access credential. In this scenario, a user may have a draggable e-mail icon 748 that corresponds to an e-mail account he has with the e-mail provider displayed on the browser 742. The image or text on the draggable icon 748 may correspond with the e-mail page so the user can clearly identify the draggable icon 748 as being associated with that particular page. Thus, as shown by the dashed, curved arrow, the user has clicked on the icon 748, dragged it over to icon 746 and released, so as to indicate an intent to have his e-mail login information applied to the application that underlies the icon 146. The user in this example previously filled out a form with his e-mail login information so that the application underlying icon 748 can pass on that information, and such storage and passing of information may be in a format that complies with a public API so that the application that underlies icon 746 may properly handle the information it receives.

While the example in FIG. 1M relates to an e-mail web page, other types of login pages are contemplated. For example, other draggable icons may be used by a user to login on any other type of secured web pages that require a user to enter a user name and a password, such as shopping web sites, calendar or scheduling web sites, and photo album web sites.

In some implementations, the user information (e.g., credit card information, login information) is stored by the web browser any time the user enters user information—but a user may establish the settings for the browser so that the information (or at least certain types of information) are not filled in automatically into web forms, but instead is only filled in when a user performs the sort of functions described herein.

The browser may, in some embodiments, prompt the user to authorize the browser to save the user information or to create a draggable icon associated with the entered user information. The browser may further prompt the user to assign a description to the newly-created icon associated with the entered user information (and perhaps to select an icon image from a list where the particular content does not plainly have an image already associated with it). For example, if the user has just entered her credit information, she may label the newly-created icon "American Express" so that the icon is easily identified for future use. In some embodiments, use of the icon (i.e., dragging and dropping of the icon to access the information associated with it) may require the user to enter a password or security code to provide heightened security to prevent unauthorized use of the stored information.

FIGS. 1E-1I show screen shots of example supplementary controls that can be provided with a web browser in an operating system. In FIG. 1E, a tabbed browser is shown with three opened pages on top of a desktop in an operating system. A web page is displayed in the browser, and a search box is displayed off the upper left corner of the browser where the presence of tabs has forced the top of the browser to fall slightly and thus make room for the search box. The browser is also pushed in slightly from the left edge of the desktop to make way for small icons along the left edge of the display, that the user may select in order to have additional information displayed to them.

FIG. 1F shows the complete column of icons after a user has selected an icon relating to the user's contacts. Such an action has caused a contacts-related panel to slight out from the column of icons, which has pushed the browser to the right in the display. The panel could also be configured to slide over the top of the browser. The contacts application takes a familiar form, and shows the computer-related status of various contacts. Other common applications are also represented by icons in the column, and a user may be permitted to add or remove such icons as they see fit so that they can represent applications that they use most often.

In FIG. 1E, the contacts application has become more specifically a chat application and its position has changed so that it has now popped up from the bottom of the display. The other on screen elements have generally stayed the same. The chat application could also be minimized so that its title bar would appear along the bottom of the display. Title bars for multiple minimized applications could also be displayed adjacent to each other.

In FIG. 1H, a user has selected to see applications supported by their device that are now represented in the column along the left-hand side of the screen. As a result, a cluster of icons for the various applications has been generated, and again the browser has been pushed to the right. In some implementations, the invocation of certain application from the column can push the browser to the side, while the innovation of other application may cause on screen items to be generated over the top of the browser.

FIG. 1I shows a toolbar that can be generated along the top edge of the display, such as by a user hovering a pointer near the top edge. This toolbar takes a form very much like the GOOGLE TOOLBAR, and includes a search box and icons for a number of features that are supported by the toolbar.

FIG. 1J shows a screen shot of an operating system displaying thumbnails of recently visited web pages that a user can select. Such a display can occur, for example, when a user chooses to minimized the browser shown in the prior figures. As can be seen, such minimizing has cause the browser to slide to the bottom of the display so that only the tabs and some of the toolbar is showing. The thumbnails in this example cover two categories and take two forms. A first category is the user's most visited sites, and the thumbnails may show a near-literal screenshot, in the shape of a screen, for such pages, much as currently occurs in the GOOGLE CHROME browser, or for the INTERNET EXPLORER browser where the GOOGLE TOOLBAR is installed. The content from the pages may be current (e.g., it may be fetched when the user minimizes the browser) or historical (i.e., it may show the sites as they existed the last time the user visited them).

The other category of thumbnails is a history of recently visited sites for the user, and the thumbnails for these sites are variable in size. In particular, they represented the actual content of the entire web page. Short pages are thus shown at a higher level of magnification and are also relatively short. Longer pages are shown at a lower level of magnification and are also long. Also, the thumbnails for recent pages can be larger than the thumbnails for older pages so as to given a better visual impression of a timeline. A user can select any of the thumbnails in order to instantiate one of the underlying pages in the browser.

FIG. 1L shows example screen shots of web pages in maximized and minimized forms. Such features may permit publishers of page content to provide long-form and short-form content, and thus to maintain a user's interest both when they are focused on the browser and when they are not. A particular process for provided such functionality is described in respect to FIG. 5E below.

As shown in the left display, a browser like that in the figures above has opened three pages and is focused on one page, the New York Times. In the right display, a user has made a selection to minimize the browser, and as a result, the browser in its initial form has disappeared (though it may also simply move to the bottom of the display). In its place are onscreen objects that take look like, and can actually be implemented as, widgets or gadgets. Each of the objects corresponds to one of the previously-opened pages from the browser, and displays information that corresponds to the information displayed on the related page, but in a smaller form.

For example, the first page is a page for the New York Times, whereas the corresponding object shows the same page title as the page, but displays only national headlines because the Times is a national newspaper. The particular headlines may be provided in a news feed from the times, where the identifier for the news feed has a direct relationship to the identifier (i.e., URL or partial URL) for the page, so that the browser can readily identify the feed from which it is to draw information in populating the object. As another example, the second web page is the local news page for the StarTribune newspaper, and the object shows local news headlines. As with the first object, the headlines may be part of URLs that a user can click on to be taken to the web page for the paper that carries the relevant story. Depending on the wishes of the web page publisher, each page may have a feed, each section may have a separate feed, or the entire web site may have a single feed. Generally, larger sites having funded owners will have more feeds.

The third page in this example is the ESPN sports site, so the dynamic content in the feed is sports scores. More particularly, the user was on the Major League Baseball page when they minimized the browser, so they are getting feeds that are specific to baseball games that are currently being played.

FIGS. 2A-2G show screen shots from a system for forming meta-web pages. In general, the meta-pages permit a user to combine various individual pages, each from the same domain or from different domains, in various manners so as to create a topical page whose individual components can be accessed by basic scrolling up and down the meta-page. Thus, for example, a user could form a meta-page by dragging onto it pages from all the major national newspapers. Each morning, the user could simply scroll down through the meta-page to see the headlines from all of the newspapers (where the meta-page may have its own URL or pseudo-URL that can be saved as a bookmark for the user), rather than having to individually load each page and switch between tabs for each page.

Figure 2B:
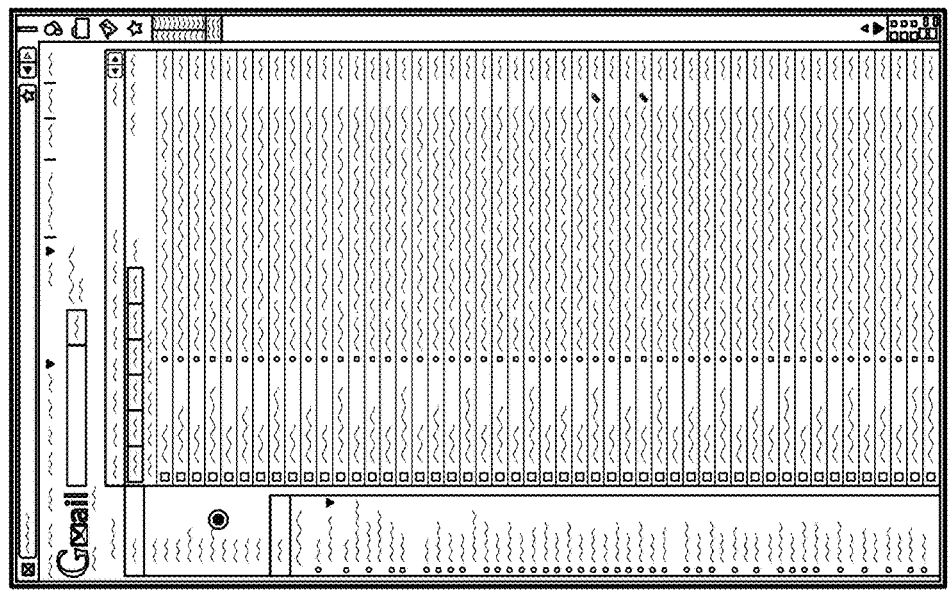
FIGS. 2A-2G show screen shots from a system for forming meta-web pages.
Figure 2A:
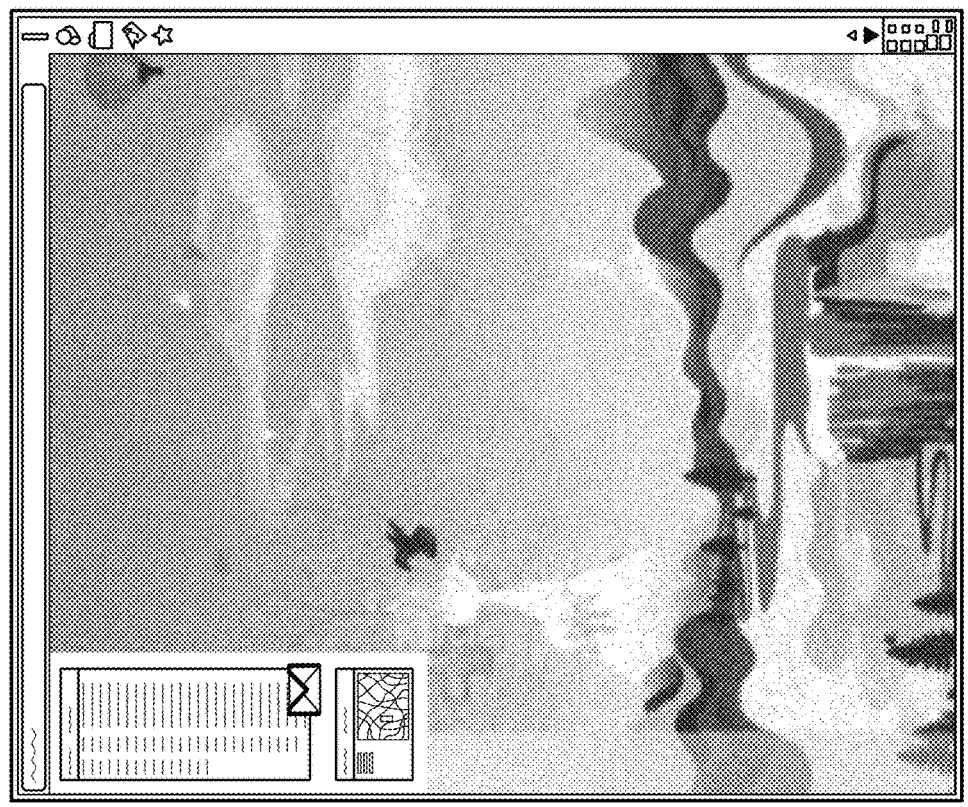

FIG. 2A shows a zoomed-out representation of a meta-page on an operating system desktop. In this example, the meta-page includes two sub-pages—an email page and a calendar page. So the user has, in effect, create a personal information manager page.

At FIG. 2B, the user has selected to view the page by clicking on the meta-page in FIG. 2A (a indicated by a lingering selection dot in FIG. 2B where the meta-page had previously appeared in FIG. 2A). Here, one can see a familiar view of the GMAIL email application. FIG. 2C shows that the user has scrolled down somewhat in the meta-page and is showing both the GMAIL sub-page and a calendar sub-page below it.

Figure 2D:
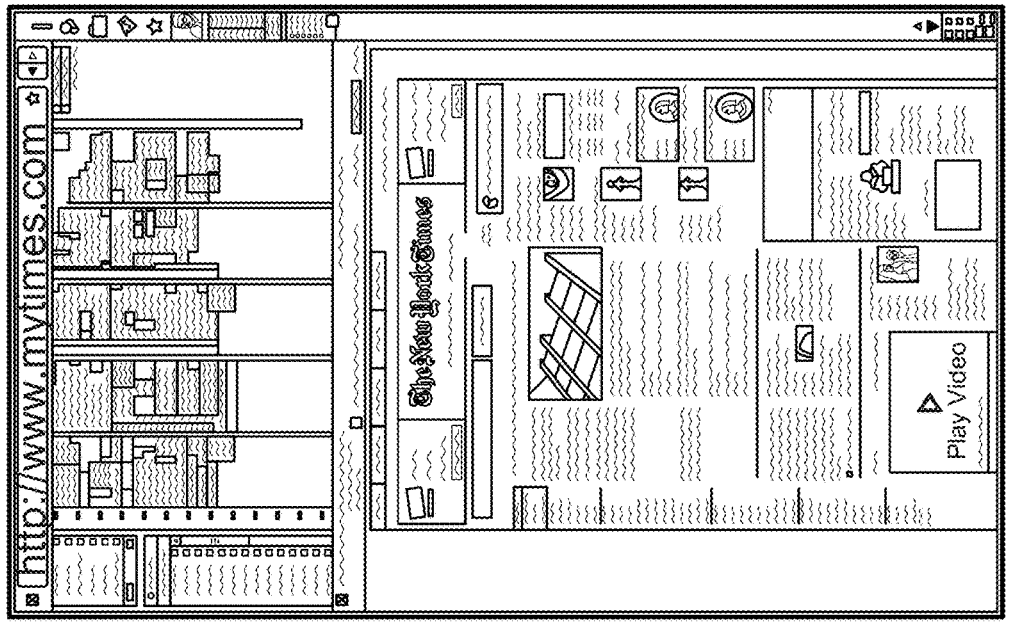
Figure 2C:
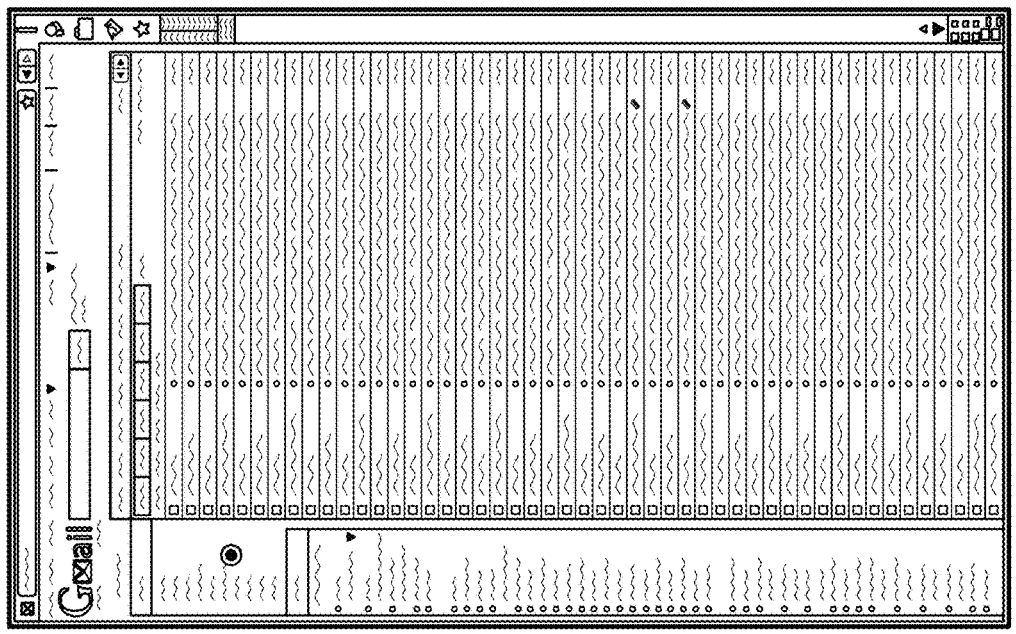
Figure 2E:
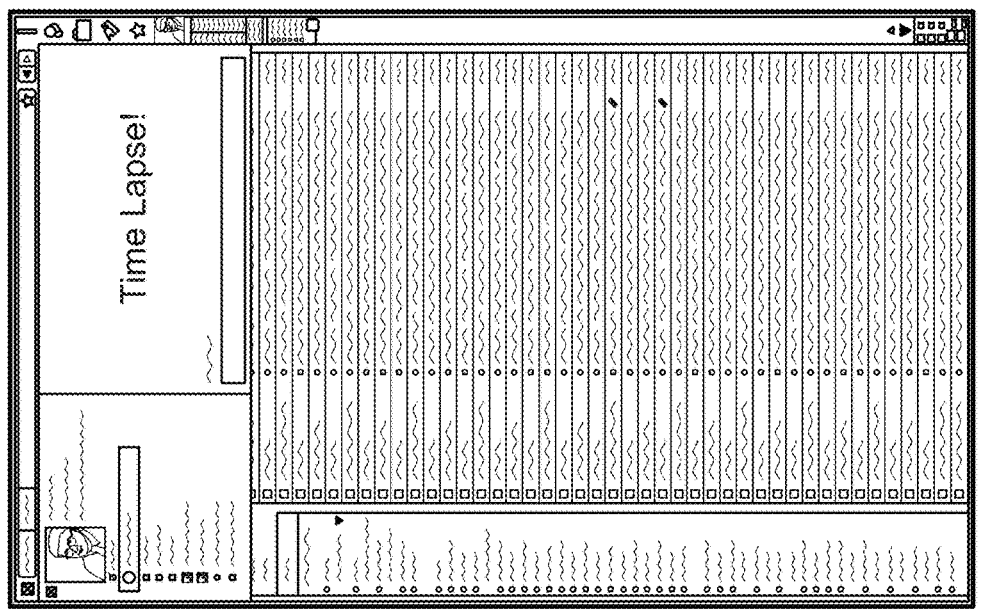
Figure 2F:
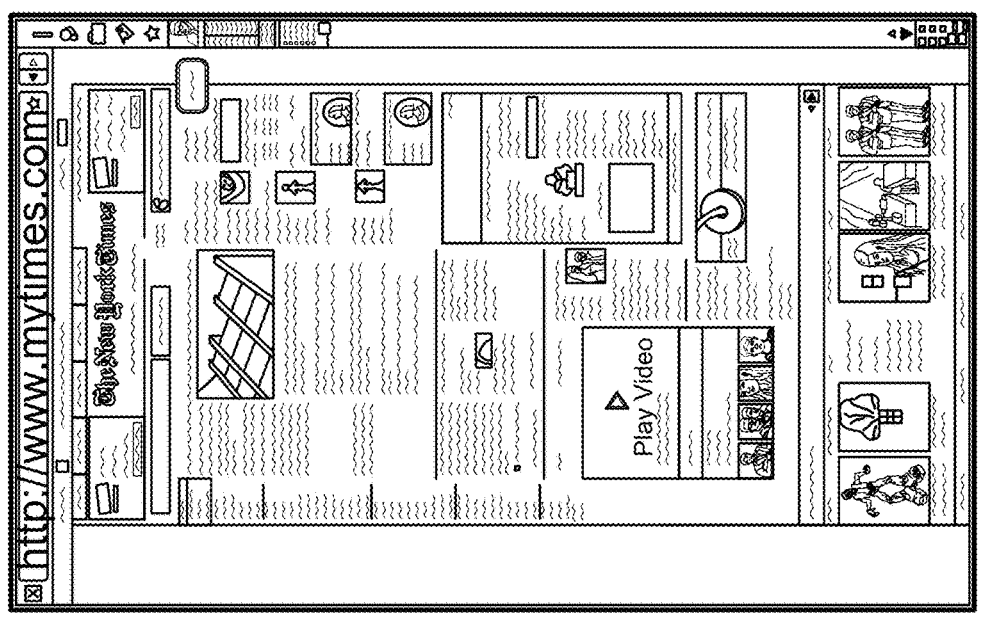

The user has scrolled down even farther in FIG. 2D, to the end of the calendar sub-page, to a New York Times sub-page. Though not shown here, the user could have added that sub-page by highlighting the meta-page, and then typing "www.nytimes.com" or "New York Times" the search box on the display. Upon entering such information, the small representation of the page may have been added to the meta-page as shown in FIG. 2A. In FIG. 2E, the user has typed the domain for the New York Times into the navigation box at the top of the display, and the page has jumped so that the New York Times In FIG. 2F, the user has scrolled back up to the GMAIL application or has typed appropriate information into the navigation box to have the screen scroll up to that same point automatically. The user has also selected an icon showing a picture of a friend so as to start a chat session with that friend. As a result, a chat application has opened a sub-window at the top of the display where the users can carry on a conversation.

Figure 2G:
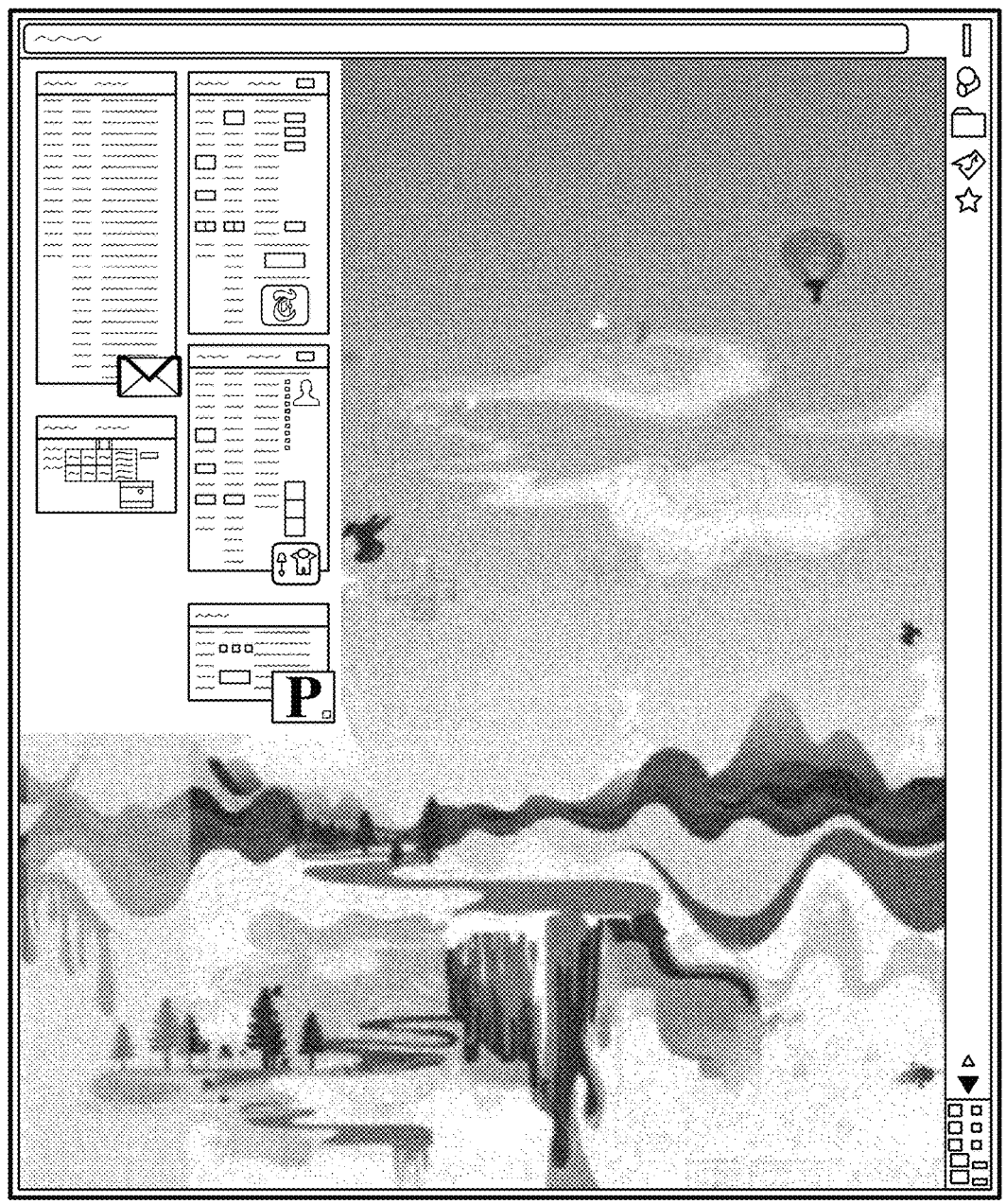

In FIG. 2G, the meta-page has been minimized an the view has returned to the desktop. Also, the user has dragged the New York Times sub-page from the first meta-page and onto the desktop so as to begin creating a second meta-page. In addition, the user has since typed two URL's into the navigation box so as to add pages for those two URL's to the newly-created second meta-page. The user may then select one of the reduced-size renderings of one of the two meta-pages so as to continue their work.

Figure 3:
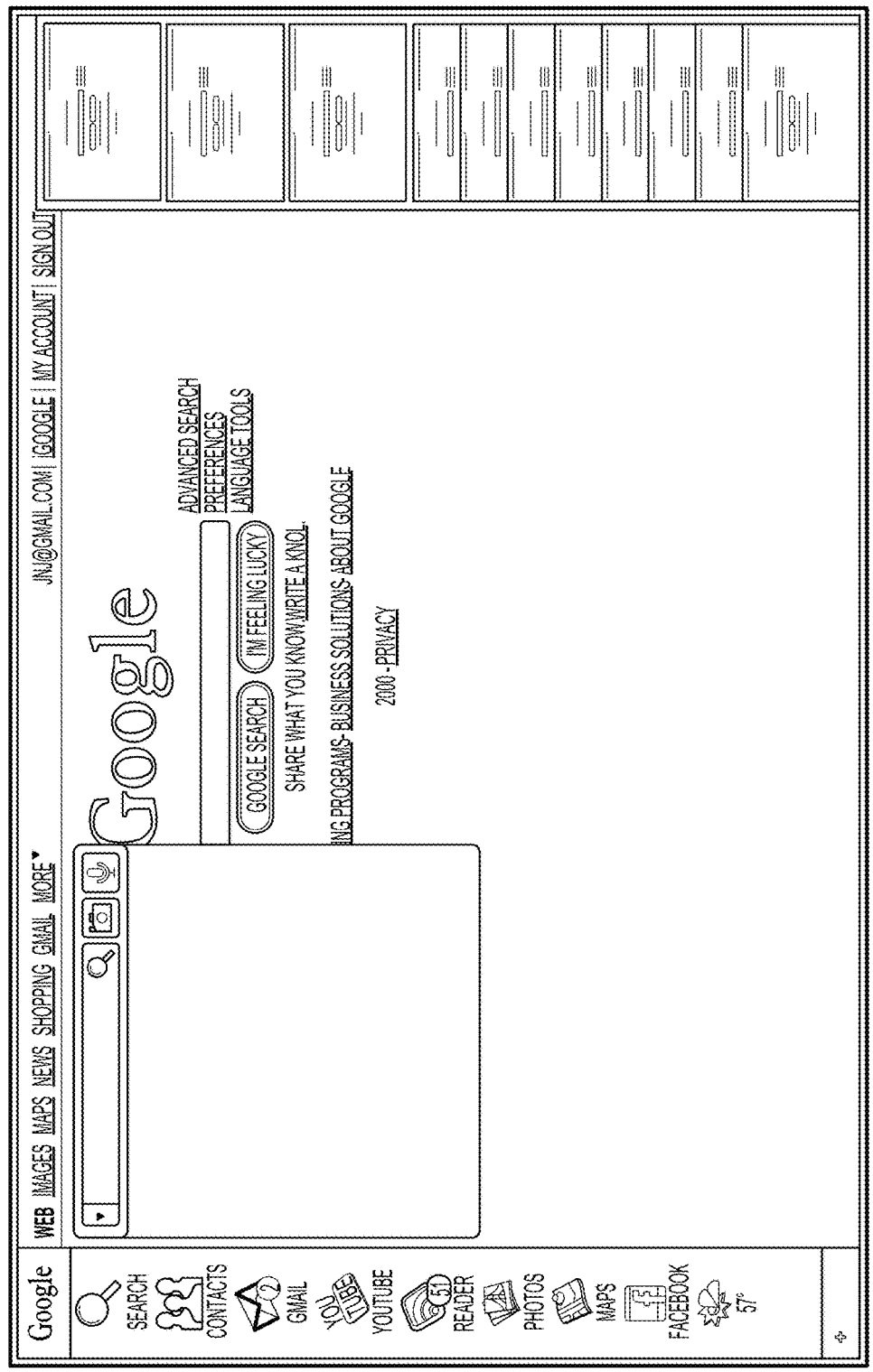
FIG. 3 is a screen shot of a chrome-less browser displaying a search screen in an operating system.

FIG. 3 is a screen shot of a chrome-less browser displaying a search screen in an operating system. This view again shows icons in a vertical column along a left edge of the display (though it could be shown against other edges or as a floating toolbar). The page displayed in the browsers is a GOOGLE search home page, and the display also shows a universal search box on top of the page, where the user may enter queries into either search box. Also in this example, a graphical history is shown along the right edge of the display, where thumbnails of recently visited pages are showing with increasing overlap, so that recent pages can be seen fully, and more distant pages can be seen less completely.

FIG. 4 is a schematic diagram of a mobile computing device for interacting with a user of a web browser system. The device is shown here in the form of a smart phone, but make take various other forms, such as a desktop personal computer, a netbook, or a laptop computer. In this example, the mobile device 402 is a slider-based smart phone having a touch-screen 404 for input and output and a trackball 406 as an alternative input mechanism.

The display 404 shows an example of a mapping application being displayed in a chrome-free browser a manner like the pages above, and also an information panel like that discussed above.

A number of components are shown schematically inside the device 402 to indicate components in the device that are associated with the features, and used to implement the features, discussed in more detail above and below. One or more of the components may be implemented as part of a programmable microprocessor on the device 402, though the particular components are shown separately in this example for clarity of explanation. Other arrangements of components are also contemplated.

The device 402 includes a display manager 408 to control various elements to be shown to a user on the touch-screen 404, while an input manager 412 manages inputs received from the touch-screen or other mechanisms such as trackball 406. The display manager may receive information from various applications and from other components of the operating system, and may determine what elements to display in relation to other elements, which elements to hide, and how to show visible elements in relation to each other. The input manager 412 may coordinate with the display manager so as interpret actions that a user takes with the device. For example, a user may place their finger on the touch screen 404 or may move a pointer on the touch screen 404 and then make a selection. The input manager 412 may refer to the display manager to determine what item the user selected by such an action, and may generate an event that may be reported to various other components that may be subscribing to such an event, such as by using event manager 410.

The device 402 may be provided with various services that may be made available to applications running on the device and/or to the operating system of the device. For example, a GPS module, which may be a common commercially-obtained module, may make determinations about a location of the device 414 and provide such information to various applications, such as applications that provide driving directions, that provide the user's location for reference by friends of the user through a social network, and the like. In a similar manner, a spelling corrector 416 may provide a service that is generally available to various applications running on the device, so that those applications can correct data that the user has input or otherwise notify the user about problems with the input.

Various physical output mechanisms may also be provided in the device 402. For example, a vibrator may be provided to give haptic feedback to a user. The vibrator may have an associated controller (not shown) that can be called by various applications or services on the device. For example, the spelling corrector 416 may cause the device to vibrate whenever a spelling error is identified by the spelling corrector 416. Also, a sounds controller 424 and related audio speaker may be provided to give a user additional feedback, such as in the form of tones or synthesized speech.

Various applications 418, 420 may run on the device and may provide data for graphics to be displayed through the display manager 412. The applications may be part of an operating system on the device 402, or may be added by a user of the device, such as from an on-line marketplace. In this example, a first application is a mapping application and may run as a standalone application or an application or plug in that runs in browser application 420. The browser application may be a standalone application or a component that is built into an operating system that runs on the device 402, and may generate displays like those described in detail elsewhere in this document.

Various messages for the operating system and the applications may be received over a network such as a wireless communications network connected to the internet, via a wireless interface 426. Information received from the network, such as from one or more remote servers, may be provided to the applications 418, 420, and information may be passed from the applications 418, 420 back to the network.

In addition, various forms of storage, including volatile storage and persistent storage, may be provided on the device 402. The persistent storage may include various data stores, such as application data 428, dictionary data 430, and user information 432. The dictionary, as described above, coordinates with and is used by the spelling corrector 416. The application data 428 may include whatever data the various applications need in order to perform their functions. Depending on the application, more or less data may be stored locally on the device 402 as opposed to being stored on a remote server system. For example, certain devices may store data for a mapping application locally, whereas others may obtain mapping data (e.g., map tiles that show images of a portion of a geographic area) from a remote server as a user navigates on a map, and may dump the data soon after.

The user information 432 may include specific information about one or more users of the computing device 402. For example, the user information may include profile information for the user, as well as setting information that controls the interaction of the device 402 with the user, and that can also control the manner in which various applications operate on the device 402. Although three various data stores are shown here for clarity, much other information would be and can be stored on device 402, and need not be arranged as shown here.

Figure 5A:
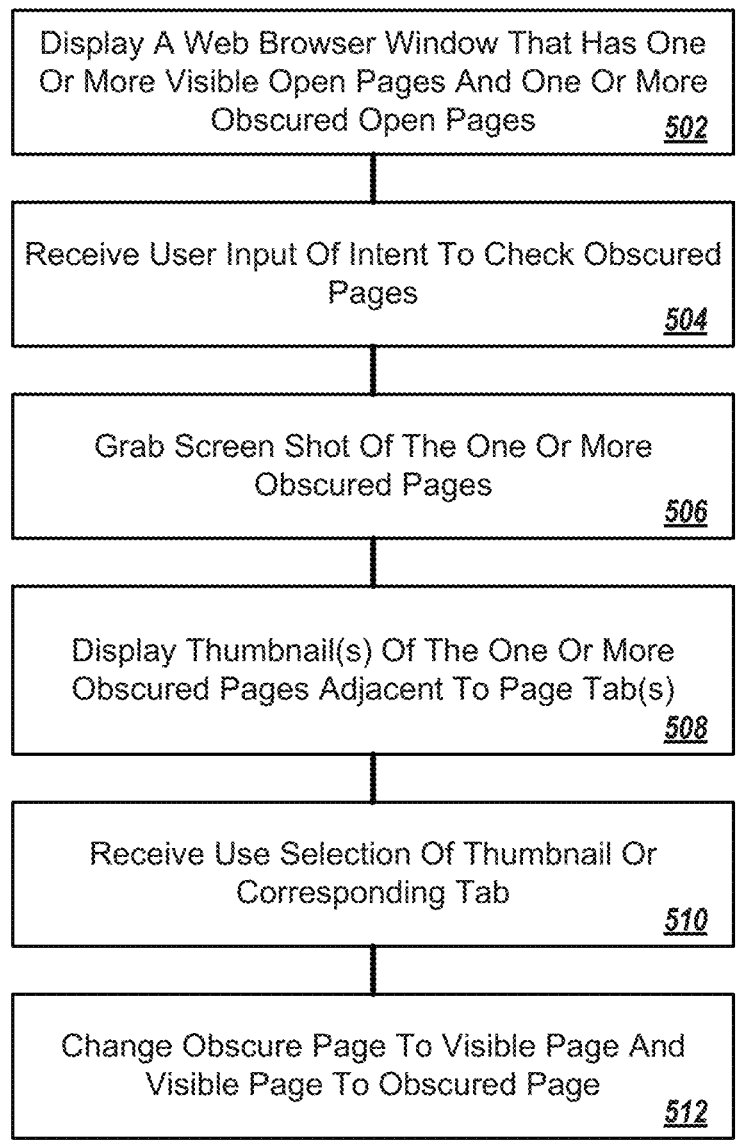
FIG. 5A is a flow chart of a process for displaying web page previews when switching between web pages.

FIG. 5A is a flow chart of a process for displaying web page previews when switching between web pages. In general, the process involves displaying, in response to user input, representations of web pages that are open in the browser but that are not currently the focus of the browser, such as secondary pages in a tabbed web browser. The representations of the pages may be formed as thumbnail images of the obscured pages, and may be shown to a user when the user is determining which page to switch to, in matters like the examples shown in FIGS. 1A and 1B above.

The process begins at box 502, where a computing device displays a web browser window that has one or more visible open pages on it and one or more obscured pages. An open page in this example can be a single web page, or a meta page that is constructed from multiple separate pages as described with respect to FIGS. 2A-2G above. A web page may also take other formats, and may display content that is remote from the computing device, or content that is local to the computing device, or both, and can be made up of any appropriate type of display that can be generated on a pane or tab for a web browser.

The visible open page will generally be represented as a page that lays visually on top of the obscured pages. The obscured pages generally will have most or all of their page content hidden behind the visible page, with a visual element, such as a tab, extending from an edge of the visible page. The extending element, such as a tab, can generally be selected by a user by clicking on the element, which will cause the selected obscured page to become the visible page by visually moving in front of the page that was previously the visible page. Other obscured pages may then be selected in a similar and familiar manner by the user.

At box 504, the process receives a user input indicating an intent by the user to check the obscured pages. For example, the user may want to review content that they believe is on one of the obscured pages, but they may want to check the pages before making a switch because they are not sure which page contains the desired content. Alternatively, a user may desire to determine whether content on a page has been updated since the last time they reviewed it, but without having to switch entirely to that page. As a result, the user may wish to see a form of page preview for each of the obscured pages so that they can make a determination whether to switch to one of such pages.

The user may express their intent to check the obscured pages in a variety of ways. As one example, a user may express the intent to see a preview of a particular obscured page by hovering their pointer over a tab for that page. The user may express intent to receive a preview of all of the steered pages by hovering their pointer above an area where all the tabs are displayed, such as a background area that appears around the tabs for the web browser. Alternatively, a user may provide a voice command indicating an intent to preview pages, such as by speaking "switch page." Also, the user may indicate such intent by way of a keyboard input, such as by entering a key combination. One such technique for switching between applications in an operating system is the ALT-TAB key combination of MICROSOFT WINDOWS.

At box 506, the process grabs a screenshot of one or more of the obscured pages. Such acquisition of an image of the page may occur in real time after the user indicates their intent, so as to provide a most updated image of the page, or may have occurred previously, such as the last time the user loaded the page, or at another appropriate time. Acquisition of the image may occur in various known manners, and the particular manner may depend on the level of resolution desired, the size of the preview desired, and other similar factors. The image may be generally of a reduced size compared to the entire page, and be known commonly as a thumbnail image of the page, so that it may be displayed conveniently to a user without obscuring a large portion of the display on the computing device. The term thumbnail is used here to represent such an image that is substantially reduced in size from the source image that is represented by the thumbnail.

At box 508, the computing device displays the thumbnails of the one or more obscured pages adjacent to the page tabs. Such display may of all or fewer of the steered pages. For example, where the display is invoked by a user hovering over a tab for a particular page, the display may be of that page only. However, when the input by the user indicates an intent to review more than one obscured page, the display may be of all of the pages, and the thumbnails may be aligned in a manner like that shown in FIG. 1B above.

At box 510, the system receives a user selection of a thumbnail or a corresponding tab for the thumbnail. For example, where a user has clicked on a display to invoke a thumbnail selection process, the user may subsequently click on one of the thumbnails that is displayed to indicate their interest in having the page associated with a thumbnail become the focus page for the web browser. Alternatively, where a key combination is used to start the process, the selection may be made by releasing the selected keys.

At box 512, the process changes the selected obscured page to a visible page, and changes the previously visible page to an obscured page. Such transition is similar to known processes of switching a tab that is the focus in a tabbed browser system. In particular, the previously obscured page may be moved visually forward in a group of tabbed pages is so that its tab is shown extending from the page, and other tabs are shown extending from behind the page so as to indicate visually that the other pages are obscured behind the new page that is the focus of the browser. The user may then make additional selections to change pages, repeating the above process, and the thumbnails that were previously displayed may be maintained in position for the user or may be removed, and the browser display may return back to its general orientation from before the user indicated an intent to change to a different page.

Figure 5B:
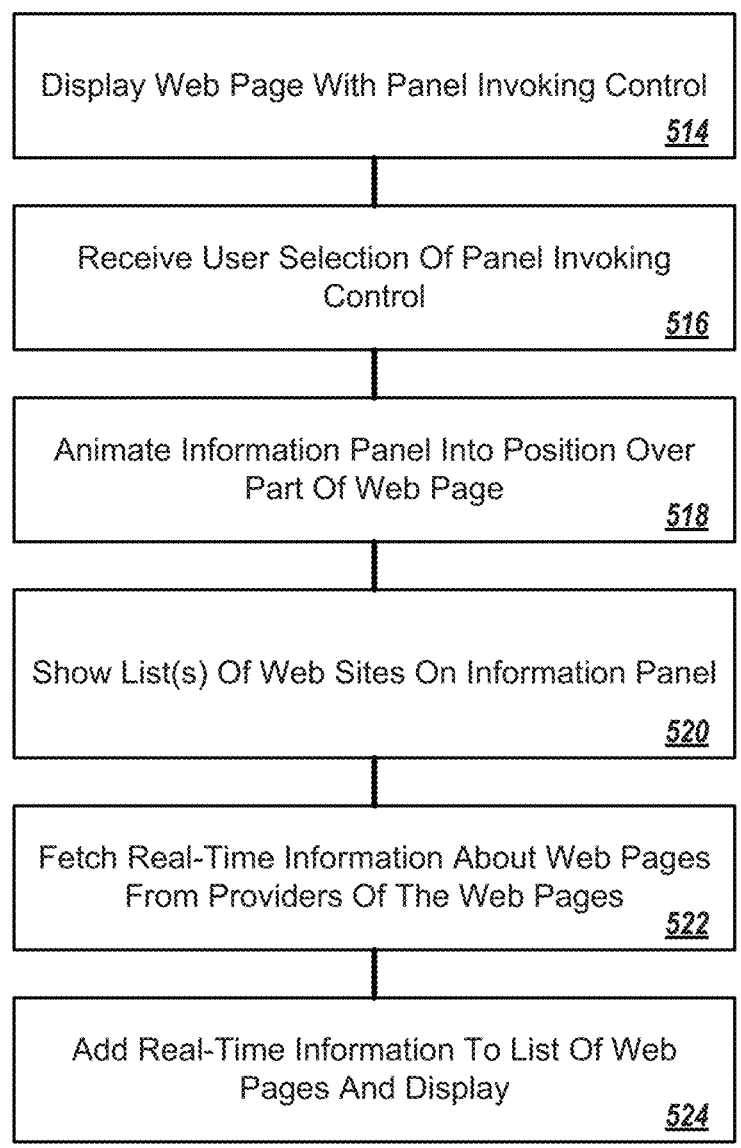
FIG. 5B is a flow chart of a process for interacting with an information panel that may be displayed with a web browser.

FIG. 5B is a flow chart of a process for interacting with an information panel that may be displayed with a web browser. In general, the process involves displaying a panel in relation to a web browser, where the panel includes particular information about the web browser and pages to be displayed on the web browser. The information may include, for example, information that is correlated to pages that a user has bookmarked, or that are in a user's recent browsing history.

At box 514, a webpage is displayed along with a panel-invoking control. In this example, the information panel is not initially displayed with the browser, so that the maximum amount of screen space may be devoted to displaying the web page itself, rather than controls for the browser. The panel-invoking control may be displayed as a small visual element near the edge of the page or the browser, and may take the form of an icon where the icon visually indicates to a user that its selection will cause information that is currently hidden off the edge of the display to be moved onto the display. As one example, the icon can include an arrow or other similar visual cue that shows that selection of the icon will cause such a transition to occur.

At box 516, a computing device receives a user selection of the panel-invoking control. Such a selection may occur in a variety of manners, such as by a user clicking on the panel-invoking control, the user clicking on the control and dragging the control inward toward the middle of the display, or a user swiping onto a touchpad from off the surface of the touchpad and into the touchpad at a side of the touchpad that corresponds to the side of the browser in which the control is displayed.

At box 518, but information panel is animated into position over the top of a part of the web page, by sliding the panel off the hidden edge of the display and onto the display. Alternatively, the panel may push the web page to the side and be displayed adjacent to the web page. The panel can display a variety of information and include a number of controls that are selectable by the user. For example, the panel may display a list of bookmarks in the form of titles of web pages that the user has previously indicated to be of interest to them, as is well known. The panel may similarly display a list of pages that represent recent pages the user has visited, in the form of a history of pages. The display of bookmarks and history may also be combined, so that bookmarks are automatically selected by the browser as pages that the user has visited frequently in the past, and are automatically arranged into topical groups or other standards, including the frequency with which the user has visited those pages. For example, a list of pages may be initially sorted in a reverse chronological order to represent pages that the user has visited recently, but pages that have been visited frequently may be elevated in the ranking in the list of pages above pages that have been visited recently but infrequently. The information panel may also display information controls for other topics, such as a graphical display of a chat application showing friends of the user who are currently online, and controls to change settings for the browser, such as security settings and the like. In addition, the panel may include a search box into which a user may enter a search query in a familiar manner.

At box 522, the process fetches real time information about web pages from providers of the web pages. The web pages from which information is fetched can include the web pages listed in the history or bookmarks. To obtain the information, the process (via the computing device on which the device is running) may make a call to the web page itself, the web page may include tags or other information that designate brief, updated, summary information for the page, and the browser may extract such information. Alternatively, the process may make a call to a page that is related to the underlying web page, such as a page having the same name as the underlying web page but that is located in an adjacent predetermined path relative to the underlying web page or that has an extension that differs from that of the underlying web page but that has the same name.

The information provided to the process may take a variety of forms but generally takes a form of information that can be displayed in a very small space and that relates to the underlying webpage. Such information commonly can include news headlines, sports scores, press release headlines, and other brief and topical information associated with the underlying web page.

At box 524, the real-time information that has been gathered relating to the web pages is added to the titles of the web pages listed in displayed to the user. For example, as the information is received, it may be added to the right of the web page names in the history or bookmarks list that is displayed in the information panel. Such real time web page information may be displayed statically or dynamically. Static display may involve showing a single set of information in the panel and maintaining that information in the panel. Dynamic display may include showing initial information in the panel and then changing to additional information, such as in the form of a textual slideshow, or in a ticker-tape type of presentation.

Using this process, then, a browser may make lists of web page titles that are more useful to a user of the browser, and the user may leave the information panel in place while they are browsing (because of its added usefulness) instead of removing it from the display of their computing device. For example, a user may appreciate seeing headline updates for their various favorite pages and thus may leave the panel open to the side of the pages. Also in this manner, basic Web bookmarks may gain some advantages of web widgets or gadgets, by having dynamic content displayed along with the web page names represented by bookmark or history listings.

Figure 5C:
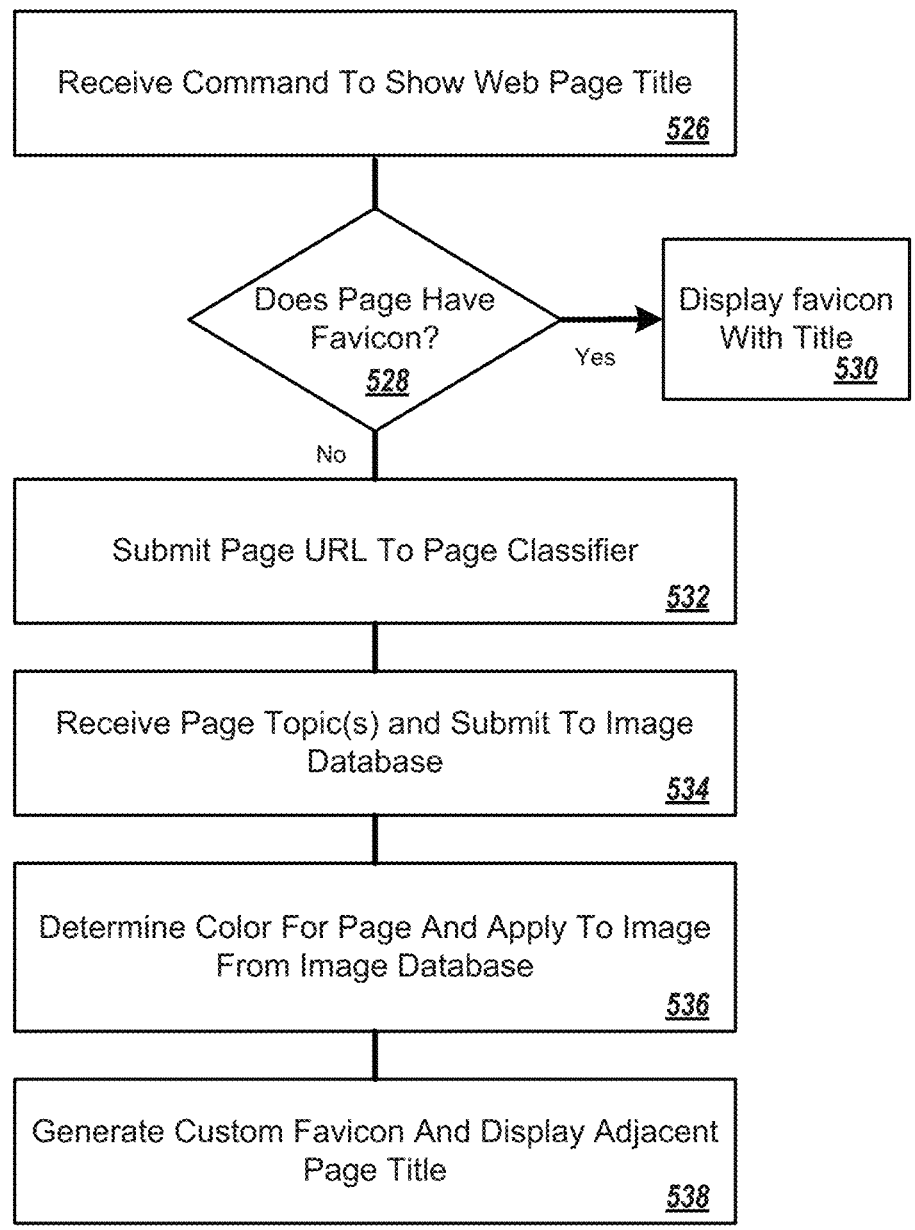
FIG. 5C is a flow chart of a process for automatically generating a favicon for a web page.

FIG. 5C is a flow chart of a process for automatically generating a favicon for a web page. In general, the process involves identifying web pages that do not have a favicon and generating automatically valid favicons for those pages. A favicons is generally understood to be a small icon corresponding to a web page or web site that helps communicate to a user of a computing device the identity of that web site. Icons are frequently shown in title bars of web browsers when a web page is displayed, or next to a list of web page titles when a web page history or bookmarks are displayed. Favicons may be useful in helping a user quickly identify a particular web page in a list of many web pages, without having to carefully read each of the web page titles.

The process begins at box 526, where a command is received to show a web page title. The command may be implicit, such as by a user selecting a control to show a list of bookmarks or a web page history that include many web page titles. Also, the command may be implicit in a user typing in a URL of a webpage, a browser opening the webpage, and the browser including in a title bar a name or the webpage and a favicon for the webpage.

At box 528, a decision is made about whether the page includes its own favicons. Such a decision may be made in a familiar manner by accessing or attempting to access a file where a favicon would be stored. If a favicons is identified, it may be displayed with the title of the web page, as shown at box 503.

If no favicons for the page is identified, a process may begin to create automatically a favicon for the webpage. By this process, at box 532, a page URL for the relevant web page is submitted to a page classifier. The page classifier may include, for example, a classifier that analyzes words and metadata regarding a page, and perhaps other pages at a similar addresses or links to the page, and generates one or more words than are topics for the page. For example, a Bayesian analysis may be used to group words and compare them to groupings of words for other pages, so as to identify topics for the page. The page classifier may be a service that can be accessed externally by the process, such as a service used to classify pages for the GOOGLE AD SENSE service. As one example, a sports-related web site may have a number of articles, or a page of that site may have an article, that uses the names of professional athletes and words like baseball, bases, steal, game, and other such words. An analysis of that page could generate the term "baseball" or the term "Major League Baseball" as a topic for the page.

At box 534, the process receives from the page classifier the page topics. The page topics may be received, for example, in the form of single or multiple words, including, from the prior example, the term "Major League Baseball." One or more received terms may then be submitted to an image database, such as the GOOGLE IMAGE SEARCH service. A submission may also be accompanied by one or more parameters, such as a parameter to request images of a certain size or type. For example, small images that are easily converted into a favicon can be requested, so as to avoid gathering images that have too much detailed for reduction. Also, the request may be made for only line drawing images, as those images may be easier to reduce in size satisfactorily.

Where the page classifier returns multiple terms, the multiple terms maybe he submitted to the image database, and one image may be selected from all the results returned from the multiple requests. For example, a highest-match image that is common to the search results from multiple of the requests may be selected as the most relevant image. Alternatively, an image that is determined to be the most relevant and yet of a quality that can be reduced satisfactorily, such as a line drawing, may be selected. Multiple best images may also be selected, and may then be displayed as an animated favicon that indexes through the multiple images.

The image for the favicon may also be selected as an image that is on the page itself. For example, the process may determine that an image near the top of a page is likely to be a logo for a company, may extract that image from the page, may crop the image to make it square or to focus solely on the logo, and may convert the image to a favicon.

An image may also be built up by the process, rather than being a preexisting image that is selected. In the example above, the favicon can be represented by the letters "MLB", by determining that those letters correspond to the topic Major League Baseball. Also, the image database may be made up of a limited set of images having an associated topic that corresponds to topics generated by the classifier. For example, an image of a football and baseball may be associated with the term "sports," and that image may be used whenever the classifier returns the word "sports" for a page.

At box 536, the process determines a color for the favicon. Selecting a color or a favicon may further help a user of a web browser quickly identify the favicon. For example, certain organizations or topics are readily associated with a particular color (e.g., UPS and brown), and a user of a computing device may more quickly form such an association in their mind, than if the color were absent. Selecting the color may occur in various manners, such as by identifying a background color or the page, a color for a logo that is imaged near the top of the page, or by other mechanisms. The color may then be applied to the image that was selected in the prior steps, such as by applying the color as a background color for the Favicon.

At box 538, a custom favicon is generated and is displayed in the web browser next to the page title. The favicon may also be stored, either on a user's computer device or on a server, so that the preexisting favicon may be served to the user when they display the name of the web site in the future. Also, the favicon as generated may be shared with other users through a server system that is associated with the web browser. Moreover, the server system itself may perform the process described above in a bulk manner, by identifying pages that it has indexed but that do not have favicons, and the analyzing such web pages and subsequently making the generated custom favicons available for use by instances of the web browser that user might employ.

Figure 5D:
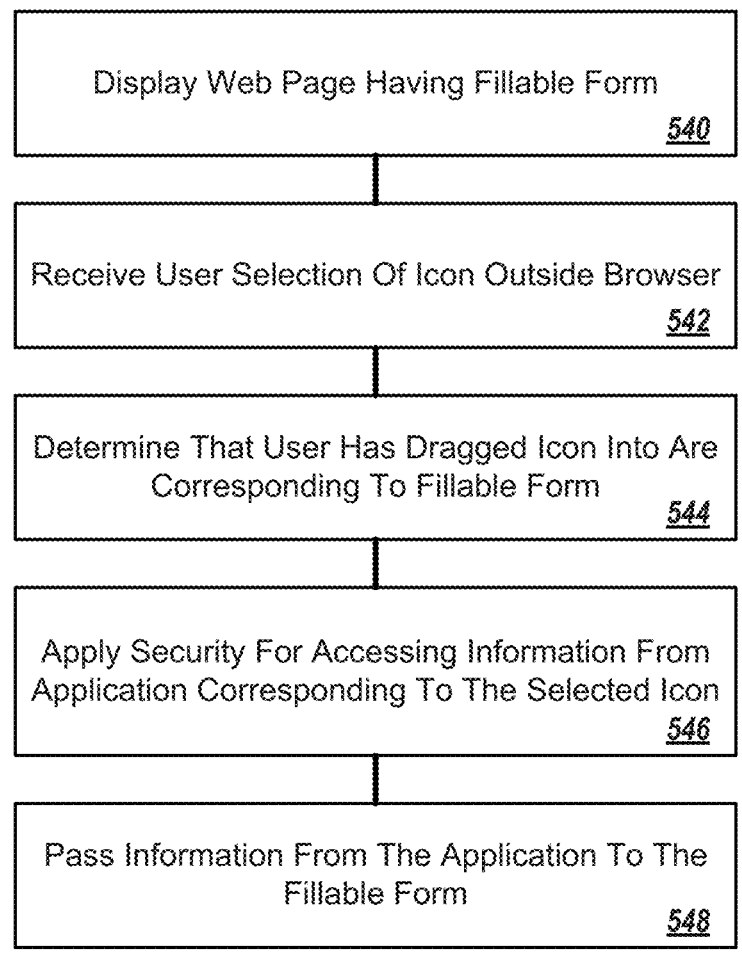
FIG. 5D is a flow chart of a process for providing information to information receiving elements on a web page, such as fillable forms.

FIG. 5D is a flow chart of a process for providing information to information-receiving elements on a web page, such as fillable forms. In general, the process involves providing the data to an element such as a fillable form in a webpage in a relatively secure manner. The process begins at box 540 where a web page having a fillable form is displayed. The fillable form may be presented in a variety of manners, including by displaying a plurality of text entry boxes into which a user may type information, such as personal information for ordering a product or service. The fillable form may also be displayed as an icon into which a user may visually place information, as next described.

The information to be provided to the fillable form may be any relevant information, but frequently includes personal, financial, or security information for a user. For example, a user who orders a product on-line may need to submit shipping address and credit card information.

Such forms may be auto-filled in common practice, but a user may not want to have certain information, such as credit card data, filled automatically (e.g., in response to no input from the user, or in response to the mere input of a few letters in a field). At the same time, the user may not want to have to locate their credit card and then type in their credit card information manually every time they buy a product on line. Thus, such a user may be provided with a application that takes their information and associates it with a desktop icon. Generally, the icon may be represented outside of the browser and secured from access by the browser or content in the browser. As shown at box 542, the user who is faced with a fillable form such as that shown in FIG. 1D, may select the icon and drag it onto the web page where the visual element (the target element) associated with the fillable form is located.

Upon determining that such a combination of moves, from a source location to a target element, have been made by the user (boxes 542, 544), the process may infer that the user would like to have their information submitted to the form. Such a process requires a sufficient level of deliberate action by the user so as to substantially remove the risk that the user would submit such information inadvertently. Yet the submission of the information by the user is relatively easy and intuitive, and much easier than typing the information from scratch.

The process may also include security to ensure that providers of web pages do not illicitly or accidentally receive information that a user does not intend to share. For example, when the user sets up the icon for sharing data, the corresponding application may require the user to fill out a security profile that identifies the types of security to be applied to the information. Also, when the user attempts to drag the icon onto a control for a fillable form, the system may display a warning that reminds the user that he or she is sharing such information (including by identifying the particular information that is being shared), and asking the user to confirm that he or she wants to share the information. Once the security checks are met, the information is passed to the provider of the web page (box 548) in a familiar manner, including over a secure connection.

As noted above, the information can be stored inside or outside the browser itself. When stored inside, the information may be stored just like other auto-fill information is traditionally stored, through the browser may be programmed to prevent such information from filling a form until the conditions discussed here (e.g., dragging an icon from outside the browser and onto a canvas on the browser) are met. Alternatively, the information may be stored with the object and away from the browser, so as to provide greater security. The object and the browser may then interoperate according to an established API in order to get the information into the relevant form or other target area.

Figure 5E:
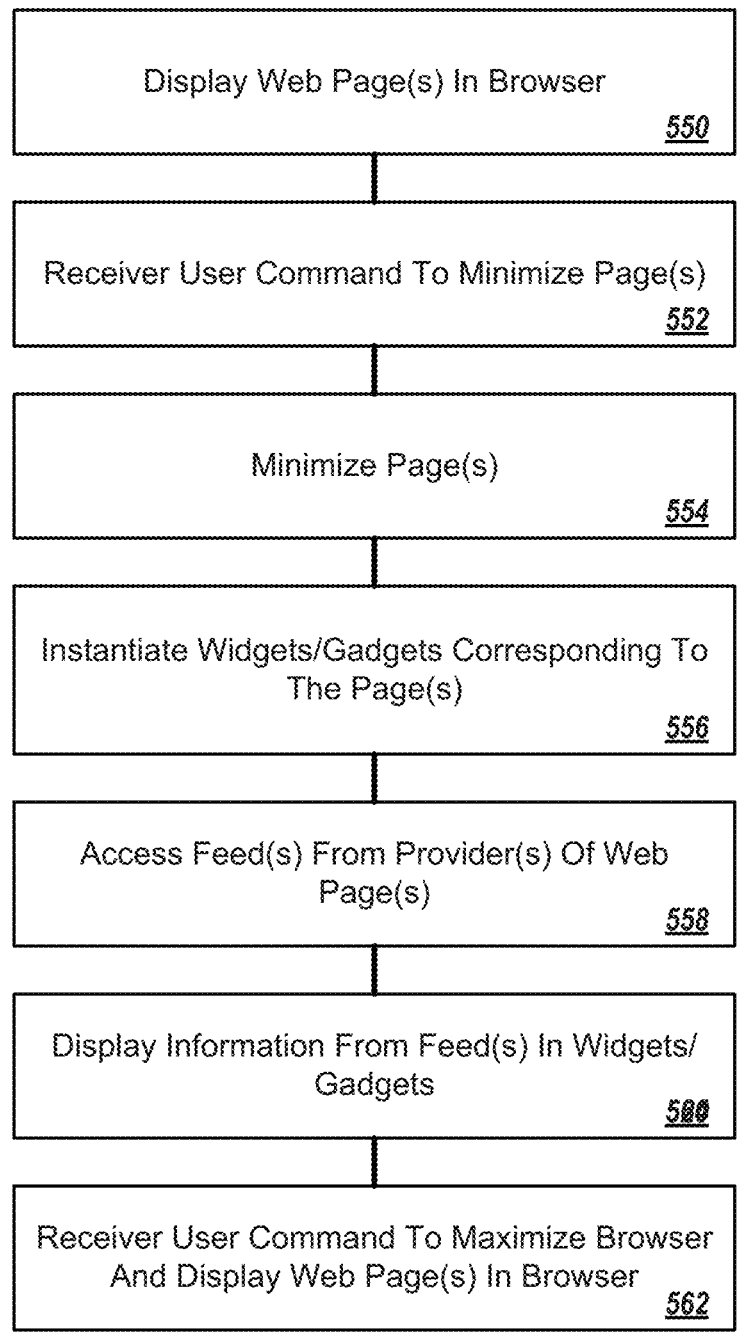
FIG. 5E is a flow chart of a process for displaying web page data for a page in multiple formats.

FIG. 5E is a flow chart of a process for displaying web page data for a page in multiple formats. In general, the process involves displaying information for a web page in multiple styles. In a first style, the information is displayed as a full-featured web page in a browser, and in a familiar manner. Normally, when such a page is minimized, or reduced in size, only the page title is displayed (e.g., in a system tray) or the original full-featured page is shown in an arbitrarily truncated manner—e.g., if a user pulls the right edge of a browser window to the left, the text of the page is cut off or it wraps at the new edge of the window, but the content is the same. In this process, the second style may be more akin to a gadget or widget whose content is coordinated with the content of the base web page.

The process begins at box 550, where one or more web pages are displayed in a familiar manner by a web browser. At box 552, a user provides a command to minimize the browser and the underlying pages. At box 554, the process minimizes the pages, such as by providing a selectable control in a system tray, where a user selection of the control can cause the browser to be maximized again.

At box 556, the process instantiates graphical user interface display objects in the form of widgets or gadgets that each correspond to one of the previously-displayed web pages (to the extent those pages support the process described here). In referring to widgets or gadgets here, we refer to programming mechanisms that display data in relatively small areas, and generally on top of an operating system background. The widgets or gadgets may display information that directly correlates to the corresponding minimized page. For example, if the page was a baseball page from a sport site, the object may display up-to-date baseball scores from around the league. If the page were the front page of a newspaper, the object may display headlines from that page. A user selection of any of the content displayed in the object may cause the browser to be re-displayed automatically, with its focus on the particular item that the user selected. For example, if the browser previously displayed a baseball page, and a user selects a particular score in the object that appears when the page is minimized, a real-time box score may be automatically displayed in a tab of the browser when the browser is re-displayed. The prior baseball page may be maintained in another tab or may be removed.

At box 558, the process accesses feeds from the appropriate web pages. The feed may be accessed in known manners, such as how widgets and gadgets currently receive information. The pointer for the appropriate feed may come from a tag that is on the original web page itself, where the publisher of the web page takes on the responsibility of publishing long-form and short-form representations of coordinated information as a service that makes more users want to visit a site operated by the publisher. Mechanisms may also be provided so that a user can define the type of information from a particular page or publisher that is displayed in an object. For example, a user may define that they want to see current scores when they minimize a sport-related site, rather than receiving headlines.

At box 560, the information received from the feeds is displayed in the objects while the page is minimized. Such information may be constantly updated, such as by adding headlines to the top of a list of headlines in a topic, as those new headlines emerge. At box 562, the system receives a user command to maximize the browser, and in response, it displays the pages again according to how they were displayed before the browser was minimized. In some instances, user interaction with the objects while the browser was minimized can be interpreted and provided to the browser so that the pages displayed when the browser is maximized are different than the pages from when the browser was minimized.

In this manner, web page publishers may maintain presence in front of users even when their pages are minimized, and user may obtain detailed information when such is there focus, and related summary information when they want to focus more on other topics. The provision of the information in long and short form is also coordinated, so that a user can identify the topic in which they are interested (e.g., by navigating to a web page on the topic), and can have access to short-form information on that topic without separately finding a separate source for such information.

Figure 6:
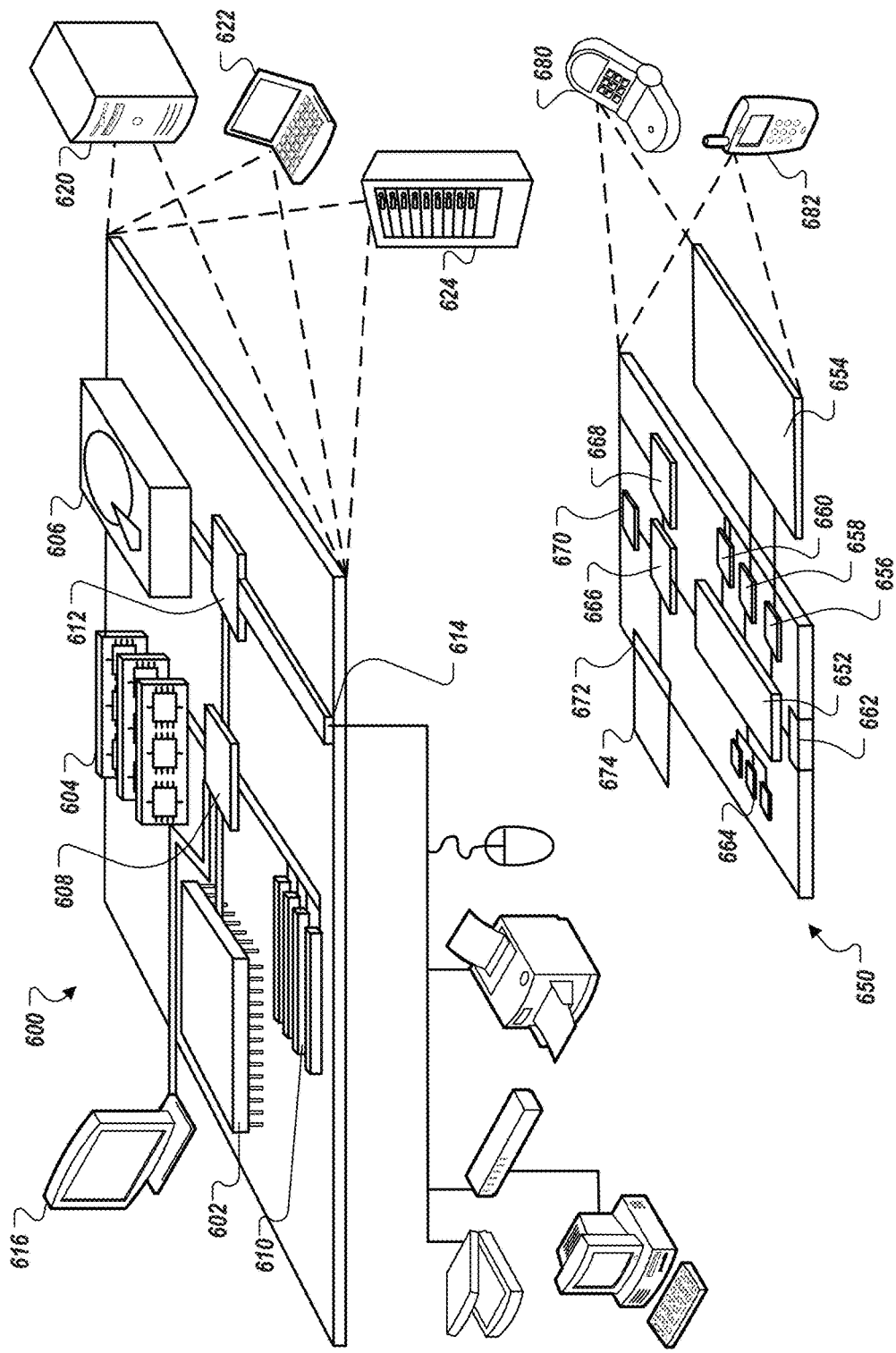
FIG. 6 shows an example of a computer device and a mobile computer device that can be used to implement the techniques described here.

FIG. 6 shows an example of a generic computer device 600 and a generic mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to television advertisements, but other forms of future, viewership-based advertisements may also be addressed, such as radio advertisements and on-line video advertisements.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method for user interaction with a web page, the method comprising:
displaying a first web page in a web browser on a user interface, the first web page including a first form having a plurality of fillable form entries;
displaying a user-selectable object on the user interface, wherein the user-selectable object is associated with a set of user information including a plurality of data entries previously entered by a user into two or more of the fillable form entries among the plurality of fillable form entries in the first form,
wherein the user interface does not display, on the user-selectable object, one or more of the plurality of data entries, and
wherein an application that is separate from the web browser is responsive to selection of the user-selectable object;
receiving a user selection and a dragging of the user-selectable object onto a first fillable form entry among the plurality of fillable form entries in the first form;
in response to the user selection and the dragging of the user-selectable object onto the first fillable form entry, authorizing the web browser to access, from the application that is separate from the web browser, the set of user information;

receiving, at the web browser and from the application, a first set of two or more data entries included within the set of user information; and filling both the first fillable form entry and one or more other fillable form entries among the plurality of fillable form entries in the first form using the first set of data entries without receiving additional user input.

2. The method of claim 1, wherein the first set of data entries includes a credit card number of a credit card.

3. The method of claim 2, wherein the user-selectable object includes an icon associated with the credit card.

4. The method of claim 1, further comprising:
requesting user authorization prior to filling both the first fillable form entry and the one or more other fillable form entries among the plurality of fillable form entries in the first form using the first set of data entries.

5. The method of claim 1, wherein the web browser does not store the first set of data entries after filling both the first fillable form entry and the one or more other fillable form entries among the plurality of fillable form entries in the first form using the first set of data entries.

6. The method of claim 1, wherein the first set of data entries includes a password.

7. The method of claim 1 further comprising:
displaying a second web page in the web browser on the user interface, wherein the second web page includes a second form having a plurality of fillable form entries, and wherein the set of user information further includes a plurality of data entries previously entered by the user into two or more of the fillable form entries among the plurality of fillable form entries in the second form;
receiving a user selection and a dragging of the user-selectable object onto a second fillable form entry among the plurality of fillable form entries in the second form;
in response to the user selection and the dragging of the user-selectable object onto the second fillable form entry, authorizing the web browser to access, from the application that is separate from the web browser, the set of user information;
receiving, at the web browser and from the application, a second set of two or more data entries included within the set of user information, wherein the second set of data entries includes one or more unique data entries that are not included in the first set of data entries; and
filling both the second fillable form entry and one or more other fillable form entries among the plurality of fillable form entries in the second form using the second set of data entries.

8. The method of claim 7, wherein the first and second sets of data entries include a name or a mailing address, and wherein the one or more unique data entries include a credit card number or a password.

9. A method for user interaction with a web page, the method comprising:
displaying a first web page in a web browser on a user interface, the first web page including a first form having a plurality of fillable form entries;
displaying a user-selectable object on the user interface, wherein the user-selectable object is associated with a set of user information including a plurality of data entries previously entered by a user into two or more of the fillable form entries among the plurality of fillable form entries in the first form,
wherein the user-selectable object does not display one or more of the plurality of data entries, and wherein an application that is separate from the web browser is responsive to selection of the user-selectable object; receiving a user selection and a dragging of the user-selectable object onto an icon or text associated with the first form;
in response to the user selection and the dragging of the user-selectable object onto the icon or text associated with the first form, authorizing the web browser to access, from the application that is separate from the web browser, the set of user information;
receiving, at the web browser and from the application, a first set of two or more data entries included within the set of user information; and
filling two or more of the fillable form entries among the plurality of fillable form entries in the first form using the first set of data entries without receiving additional user input.

10. The method of claim 9, wherein the first set data entries includes a credit card number of a credit card.

11. The method of claim 10, wherein the user-selectable object includes an image associated with the credit card.

12. The method of claim 9, further comprising:
requesting user authorization prior to filling the two or more fillable form entries among the plurality of fillable form entries in the first form using the first set of data entries.

13. The method of claim 9, wherein the web browser does not store the first set of data entries after filling the two or more fillable form entries among the plurality of fillable form entries in the first form using the first set of data entries.

14. The method of claim 9 further comprising:
displaying a second web page in the web browser on the user interface, wherein the second web page includes a second form having a plurality of fillable form entries, and wherein the set of user information further includes a plurality of data entries previously entered by the user into two or more of the fillable form entries among the plurality of fillable form entries in the second form;
receiving a user selection and a dragging of the user-selectable object onto an icon or text associated with the second form;
in response to the user selection and the dragging of the user-selectable object onto the icon or text associated with the second form, authorizing the web browser to access, from the application that is separate from the web browser, the set of user information;
receiving, at the web browser and from the application, a second set of two or more data entries included within the set of user information, wherein the second set of data entries includes one or more unique data entries that are not included in the first set of data entries; and
filling two or more of the fillable form entries among the plurality of fillable form entries in the second form using the second set of data entries.

15. A non-transitory computer-readable storage medium storing instructions that, when executed by one or more processing devices, cause the processing devices to perform operations comprising:
displaying a first web page in a web browser on a user interface, the first web page including a first form having a plurality of fillable form entries;
displaying a user-selectable object on the user interface, wherein the user-selectable object is associated with a set of user information including a plurality of data entries previously entered by a user into two or more of the fillable form entries among the plurality of fillable form entries in the first form, wherein the user-selectable object does not display one or more of the plurality of data entries, and wherein an application that is separate from the web browser is responsive to selection of the user-selectable object;

receiving a user selection and a dragging of the user-selectable object onto a first fillable form entry among the plurality of fillable form entries in the first form;

in response to the user selection and the dragging of the user-selectable object onto the first fillable form entry, authorizing the web browser to access, from the application that is separate from the web browser, the set of user information;

receiving, at the web browser and from the application, a first set of two or more data entries included within the set of user information; and filling both the first fillable form entry and one or more other fillable form entries among the plurality of fillable form entries in the first form using the first set of data entries without receiving additional user input.

16. The non-transitory computer-readable storage medium of claim 15, wherein the first set of data entries a credit card number of a credit card.

17. The non-transitory computer-readable storage medium of claim 16, wherein the user-selectable object includes an icon associated with the credit card.

18. The non-transitory computer-readable storage medium of claim 15, the operations further comprising:

requesting user authorization prior to filling both the first fillable form entry and the one or more other fillable form entries among the plurality of fillable form entries in the first form using the first set of data entries.

19. The non-transitory computer-readable storage medium of claim 15, wherein the web browser does not store the first set of data entries after filling both the first fillable form entry and the one or more other fillable form entries among the plurality of fillable form entries in the first form using the first set of data entries.

20. The non-transitory computer-readable storage medium of claim 15, the operations further comprising:

displaying a second web page in the web browser on the user interface, wherein the second web page includes a second form having a plurality of fillable form entries, and wherein the set of user information further includes a plurality of data entries previously entered by the user into two or more of the fillable form entries among the plurality of fillable form entries in the second form;

receiving a user selection and a dragging of the user-selectable object onto a second fillable form entry among the plurality of fillable form entries in the second form;

in response to the user selection and the dragging of the user-selectable object onto the second fillable form entry, authorizing the web browser to access, from the application that is separate from the web browser, the set of user information;

receiving, at the web browser and from the application, a second set of two or more data entries included within the set of user information, wherein the second set of data entries includes one or more unique data entries that are not included in the first set of data entries; and filling both the second fillable form entry and one or more other fillable form entries among the plurality of fillable form entries in the second form using the second set of data entries.

* * * * *